US011952554B2

(12) United States Patent
van Buskirk et al.

(10) Patent No.: US 11,952,554 B2
(45) **Date of Patent: *Apr. 9, 2024**

(54) ALKYL POLYGLYCOSIDE-CONTAINING CLEANING FORMULATIONS FOR CHEMICALLY SENSITIVE INDIVIDUALS

(71) Applicant: Living Clean NZ, Ltd., Greenbrae, CA (US)

(72) Inventors: Gregory van Buskirk, Danville, CA (US); Anne Steinemann, Townsville (AU)

(73) Assignee: Sensitive Home, Inc., Greenbrae, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/223,002

(22) Filed: Apr. 6, 2021

(65) Prior Publication Data

US 2023/0121786 A1 Apr. 20, 2023

(51) Int. Cl.

| | |
|---|---|
| ***C11D 1/83*** | (2006.01) |
| ***C11D 1/66*** | (2006.01) |
| ***C11D 1/74*** | (2006.01) |
| ***C11D 3/00*** | (2006.01) |
| ***C11D 3/20*** | (2006.01) |
| ***C11D 3/43*** | (2006.01) |
| ***C11D 11/00*** | (2006.01) |
| ***C11D 17/00*** | (2006.01) |

(52) U.S. Cl.

CPC .............. *C11D 1/662* (2013.01); *C11D 1/667* (2013.01); *C11D 1/74* (2013.01); *C11D 3/0047* (2013.01); *C11D 3/2006* (2013.01); *C11D 3/2041* (2013.01); *C11D 3/43* (2013.01); *C11D 11/0017* (2013.01); *C11D 11/0023* (2013.01); *C11D 17/0008* (2013.01)

(58) Field of Classification Search

CPC .. C11D 1/146; C11D 1/83; C11D 3/43; C11D 11/0017; C11D 11/0023; C11D 3/22

See application file for complete search history.

(56) References Cited

U.S. PATENT DOCUMENTS

| | | | | |
|---|---|---|---|---|
| 10,138,443 | B2 * | 11/2018 | Keenan | C11D 11/0023 |
| 2010/0234269 | A1 * | 9/2010 | Dreilinger | C11D 3/044 510/405 |
| 2013/0059796 | A1 * | 3/2013 | Chang | A61K 9/107 514/20.5 |
| 2014/0242195 | A1 * | 8/2014 | Dixon | C11D 1/72 424/719 |
| 2019/0373886 | A1 * | 12/2019 | Karandikar | A01N 25/30 |
| 2020/0377822 | A1 * | 12/2020 | van Buskirk | C11D 3/044 |
| 2022/0133618 | A1 * | 5/2022 | McKiernan | A61K 8/8158 424/70.13 |

* cited by examiner

*Primary Examiner* — Charles I Boyer

(74) *Attorney, Agent, or Firm* — The Firenza Group Ltd. LLC; Sharon R. Kantor

(57) ABSTRACT

The present disclosure relates to cleaning compositions in general, and cleaning compositions that are well suited for use by individuals, who experience adverse health effects that may occur upon exposure to certain chemicals. This condition, characterized as multiple chemical sensitivities (MCS), makes it virtually impossible for certain individuals to use commercially available cleaning products without inducing immunological responses. The disclosure presents and describes protocols for the formulation and evaluation of a variety of cleaning products and dilutable cleaning product concentrates using a combination of $^{14}C$ assay, head space analysis and screening of both ingredients and final products for governmentally-regulated materials. The methods and compositions newly presented herein avoid causing adverse health responses in individuals and are suitable for use by any person, particularly individuals who experience MCS.

11 Claims, No Drawings

ALKYL POLYGLYCOSIDE-CONTAINING CLEANING FORMULATIONS FOR CHEMICALLY SENSITIVE INDIVIDUALS

CROSS-REFERENCE TO RELATED APPLICATION

This application is a continuation-in-part of application for patent U.S. Ser. No. 16/987,416 filed 7 Aug. 2020, which is a continuation-in-part of U.S. Ser. No. 15/306,109 filed 24 Oct. 2016, now U.S. Pat. No. 10,767,137 issued 8 Sep. 2020, which is a § 371 of PCT/US2015/027403 filed 23 Apr. 2015, and claims priority from U.S. Prov'l. Appl. Ser. No. 61/982,887 filed 23 Apr. 2014.

BACKGROUND OF THE DISCLOSURE

Field of the Disclosure

The present disclosure relates to cleaning compositions in general, and cleaning compositions well suited for those individuals, who experience multiple chemical sensitivities (MCS), in particular. Individuals with MCS are virtually unable to use commercially available cleaners. The instant disclosure concerns the selection of ingredients and methods for formulating and evaluating a series of cleaning products for use by any person, including individuals with MCS.

Cleaning product compositions that are suitable for cleaning clothing, dishware, countertops and other hard surfaces have been commercially prepared, marketed, and sold to consumers for over two hundred years. As cleaning technology progressed, environmental and safety issues sometimes lagged behind discoveries in cleaning efficacy. For example, in the late 1950's and early 1960's, it was found that synthetic surfactants that had supplanted natural soap products exhibited poor biodegradability, and were building up in wastewater streams; streams laden with tenacious foam were widespread, and tremendous efforts were focused on finding alternatives. In the 1970's, certain builder compounds also came under scrutiny for their environmental impact, such as eutrophication on inland lakes and ponds. In the search for alternate builder materials, one candidate material, nitrilotriacetic acid, NTA, was found to be a very promising candidate. Fortunately, before it reached mass distribution, safety tests showed that it could transport heavy metals across placental membranes, which was thought of as potentially harmful to developing fetuses.

These examples, among others, has led to attention being paid to safety on par with that of cleaning performance; in fact, attention to the issue has resulted in numerous very effective ingredients being removed from commerce. By and large, most cleaning ingredients currently in use have resolved many of the issues of the past, and now there is widespread effort to understand the potential after-effects of cleaning ingredients as far as acute toxicity, chronic toxicity, carcinogenicity, mutagenicity, teratogenicity, and hormone disruption. Indeed, it is now common to investigate these potential effects before ingredients are brought to market.

One further phenomenon that has received attention in the last few years is the effect of cleaning compositions on chemically sensitive individuals. In westernized countries, asthma and related atopic disorders such as eczema and hay fever are now major public health concerns, due to their high prevalence—approximately 20% of the people in the United States are estimated to be sufferers. Understandably, there is concern associated with significant ill health and high societal and healthcare costs. Multiple scientific studies have raised concerns about the potential for consumer products to cause or exacerbate asthma or asthma-like responses.

While the removal of dyes and fragrances from cleaning products have alleviated responses of some sensitive individuals, there are a considerable number of consumers who are not able to use commercially-available products for reasons that until now have not been well-understood. These individuals often turn to centuries-old cleaners such as vinegar and baking soda; products that are lacking in cleaning efficacy, but are used as a last resort. Unfortunately, while the mechanism whereby these individuals become highly and multiply sensitized is not understood, when they do become sensitized, there is no known cure for reversal of debilitating responses. Products are therefore needed that are not only designed for these individuals, but for a general population that possibly but unknowingly is vulnerable to acquiring multiple chemical sensitivities.

In recent years, more and more products are being sold which claim to be "green", "environmentally friendly", "natural", "organic", "sustainable", etc., with the implication that such products contain ingredients that are bio-based, or at least have lower levels of petro-chemical ingredients. While some of these products have been based on well-founded technology, the actions of some have caused environmental advocates as well as the media to warn against the phenomenon of trying to promote a product's credentials through dubious claims as "greenwashing." Although some regulatory agencies, such as the EPA and FDA, provided regulations and standards for environmentally hazardous substances and food and drugs respectively, there is no similar agency that specifically covers cleaning products. In addition, none of these agencies have developed clear guidelines for the terms "natural", "green", "environmentally friendly" or the like. There are some organizations, which provide lists of approved natural components and standards for components based on standardized test methods, which measure toxicity, biodegradability and other factors for determining the naturalness and environmental impact of a given product. However, there is little guidance on issues concerning the use of such terms as "eco-hybrids" or "hybrid surfactants" that are comprised of both petroleum and plant-based chemistries, which is contributes to the ongoing problem of "greenwashing".

There is perhaps a larger problem with the implication that no matter how "green" or "natural" a product might be, such products may imply that they are safer for consumers than other mainstream products. While standards have been established to measure the degree of bio-basis of a product, the need for standards to better promote the safety of such products has received too little attention, much less been established. No organizations can certify the overall safety of consumer cleaning products, in particular towards consumers that suffer from multiple chemical sensitivities.

In addition to proximate effects of potentially deleterious ingredients, increasing attention has turned toward understanding conveyance of such chemicals from the household to the larger environment. Indeed, it has been reported that the exhaust coming out of a dryer vent has detectable amounts of volatile organic compounds (VOCs) in all tested commercially available detergent products. See A. C. Steinemann, L. G. Gallagher, A. L. Davis, and I. C. MacGregor, "Chemical Emissions from Residential Dryer Vents During Use of Fragranced Laundry Products," *Air Quality, Atmosphere and Health,* 6 (2011) 151-156. VOCs from consumer products can migrate outdoors and thus impact outdoor air quality. According to California Air Resources Board 1990 statistics, some 265 tons of VOCs were released into California air from the use of consumer products each day. See B. Bridges, "Fragrance: Emerging Health and Environmental Concerns," *Flavour and Fragrance Journal,* 17 (2002) 361-371. This makes it difficult for a customer trying to make an environmentally conscious decision to purchase cleaning products that will not release harmful VOCs into the atmosphere.

In summary, cleaning products available in the market today do not explicitly address all aspects of consumer safety. While the vast majority of cleaning product manufacturers ensure that their products cause minimal acute and chronic toxicity problems, exposure to cleaning product chemicals has been associated with the development and exacerbation of asthma and related disorders. However, consumers who may desire to lessen their exposure to harmful chemicals by purchasing safe cleaning products are unable to do so because product ingredients are not fully disclosed on labels. Further, the ingredient profiles of cleaning products that are claimed to be green are remarkably similar to those not labeled green, causing confusion in the minds of consumers looking for safe cleaning products. Indeed, experts on indoor air quality have shown the presence of known carcinogens and hazardous air pollutants even in cleaning products that are free of fragrances and dyes.

Description of the Related Art

U.S. Pat. Nos. 6,973,362 and 7,096,084 to Long, et al., teach a method for evaluating chemical components based on their function in the product. The methods taught by Long require first, that the function of a given raw material in a product be identified, and then a set of predetermined criteria be applied based on the function of the raw material, to determine the raw material's designated environmental class rating, which is then given an environmental grade of from 1-3. The problem with this method is that it requires an individual, burdensome analysis of each component of a composition to arrive at a final value for the composition as a whole. In addition, it requires that the individual components be analyzed by their function and one or more components in a composition may have multiple functions. Furthermore, this method requires knowledge of all the components, their percentages in the formulation and their functions in a given formulation, which makes testing products off the shelf impossible or impractical because the required information is often not readily available. The end result is that although this method provides a standardized method for measuring the environmental impact of a given chemical formulation, it too is burdensome and requires too much information about the components and their functions to make it practical for use in testing a wide range of compositions that are available on store shelves.

International Publications Nos. WO2007099294, WO2009024743, and WO2009024747 assigned to Reckitt Benckiser Group, plc, teach compositions for toilet cleaning and hard surface cleaning which are "environmentally acceptable," but the application does not clearly define what is meant by "environmentally acceptable". The publications merely teach cleaning compositions, which do not have high levels of volatile organic compounds or VOCs, and exclude certain acids, solvents, chelating agents and thickeners. While these applications teach certain "environmentally acceptable" compositions, they do not establish any criteria or test methods which could be used to determine if other compositions meet this criteria other than those compositions which may have the same exact ingredients as those taught in the application.

Similarly, U.S. Pat. Nos. 5,990,065 and 6,069,122 assigned to Procter & Gamble teach compositions for dishwashing detergents that contain natural surfactants and solvents, but they do not teach a method or criteria of determining whether a composition is "natural" or a means of measuring the natural components in a given composition. These patents merely teach a means of making a particular dishwashing composition that contains some natural ingredients.

SUMMARY OF THE DISCLOSURE

The present disclosure concerns a new scientific protocol for the formulation of cleaning products to minimize the triggering of asthma or other immunological responses in humans. In addition to improving the outlook for symptom-free cleaning, products generated according to the criteria described herein, while virtually non-petroleum based, are equivalent in performance to existing cleaning products on the market.

Definitions

In the present specification and claims, reference will be made to phrases and terms of art which are expressly defined for use herein as follows:

Active ingredient or active material refers to entities that contribute to the cleaning of stains and soils and/or disinfecting of fabrics or surfaces. A chemical mixture as procured from suppliers may be diluted with a solvent such as water, which serves no purpose in cleaning and/or disinfection; in such case, the active ingredient refers only to the portion of the chemical mixture that serves a purpose to clean and/or disinfect. This term does not generally include aesthetic ingredients such as fragrance materials, colorants, viscosity modifiers, preservatives, or the like.

Biologically based carbon or bio-based carbon is carbon derived from plant or animal sources that have lived up until the relatively recent past. It is distinguished from carbon derived from fossil sources such as coal, subterranean natural gas, oil or petroleum-based carbon. Bio-based carbon is characterized by the presence of radioactive $^{14}C$, unlike fossil sources of carbon in which radioactive $^{14}C$ is depleted or entirely absent.

Chemical allergy describes the adverse health effects that my result when exposure to a chemical elicits an immune response in an individual. Chemical allergens produce reactions similar to allergens such as pollens, weeds, and dander, but appear to be generated when lower-molecular weight chemicals bind to carrier macromolecules. See M. H. Karol, O. T. Macina, and A. Cunningham, "Cell and molecular biology of chemical allergy," *Ann Allergy Asthma Immunol.* 87 (2001) 28-32.

Cleaning composition or cleaning formulation as used herein refers to a mixture of ingredients assembled together for the purpose of providing an aid to the removal of dirt, soil, grime, food waste, etc., from a surface. A cleaning composition may be formulated for use in cleaning laundry, hard surfaces such as dishes, kitchen surfaces, bathrooms, glass, mirrors, etc., and may be comprised of both of active ingredients and aesthetic ingredients. A cleaning composition is distinguished from a product that is primarily a single cleaning active, such as a bar of soap. A cleaning composition is typically the product presented for sale to consumers.

Greenwashing as used herein refers to the practice of making or making a false, misleading, or inflated green marketing claims. This practice was expanded upon in December 2007 by the environmental marketing firm TerraChoice. See "The Six Sins of Greenwashing™," A 'Green Paper' by TerraChoice Environmental Marketing Inc. (November 2007); http://www.sinsofgreenwashing.com/index6b90.pdf. This article is incorporated herein by reference in its entirety.

Headspace or headspace technology as used herein concerns measurement and characterization of components present in the space above a particular composition or ingredient. Headspace analysis involves removing volatile compounds from the headspace surrounding an object or other material of interest using either an inert gas or by establishing a vacuum. The compounds are then trapped and analyzed with techniques such as gas chromatography, mass spectrometry or Carbon-13 NMR. (See, for example, en.wikipedia.org/wiki/Headspace technology).

Modern carbon refers to carbon derived from modern life forms, either plant or animal. It is distinguished from carbon derived from fossil sources such as coal, subterranean natural gas, oil or petroleum-based carbon. It is characterized by presence of radioactive $^{14}C$ in its make-up, which is depleted in feedstocks sourced from fossil carbon.

Product refers to a cleaning composition or cleaning formulation offered for commercial sale. The term can be understood to be synonymous with cleaning composition or cleaning formulation.

Renewable carbon source or renewably sourced carbon is synonymous with modern carbon, and refers to carbon sourced from non-primitive or non-ancient sources, i.e., it is not derived from fossil sources, which is coal, subterranean natural gas, oil or petroleum-based carbon. Renewable carbon source or renewably sourced carbon derives from modern life forms, either plant or animal, and is labeled as renewable because it is relatively easily replenished relative to fossil carbon, which takes millennia if not eons to form. It is characterized by the presence of radioactive $^{14}C$ in its make-up, which is depleted in feedstocks sourced from fossil carbon.

Soap as used herein refers to saponified animal fats and vegetable oils. Soap is understood to be distinguishable from synthetic surfactants, builders, pH adjusters, solvents, soil release agents, antimicrobials, enzymes and bleaching agents.

DETAILED DESCRIPTION OF THE DISCLOSURE

The instant disclosure concerns a multi-tiered approach to screening ingredients for suitability for use in cleaning products, formulating cleaning products that contain acceptable ingredients, and evaluating the resulting cleaning products thus formulated. As all cleaning products are combinations of raw materials, which individually may constitute mixtures, the chance of including undesirable chemicals in cleaning products is therefore high without an appropriate screening process.

Modern Carbon-Based Ingredients

Radiocarbon dating and analysis is a commonly used process to date carbon-based artifacts and remains within the field of archeology. More recently, radiocarbon dating has been used for testing a variety of different products including, but not limited, to: personal care products, wipes, lubricants, plastics, cleaning products, gardening products, etc. The subject is discussed extensively in "Determining the Modern Carbon Content of Biobased Products Using Radiocarbon Analysis", by G. A. Norton and S. L. Devlin, from Iowa State University, published by Bioresource Technology 97 (2006) 2084-2090; the article in its entirely is herein incorporated by reference.

The article on determining modern carbon content describes the process of radiocarbon dating for the determination of bio-based content in a formulation. Several carbon isotopes are present in nature, $^{12}C$, $^{13}C$ and $^{14}C$. The $^{12}C$ is a stable isotope and the $^{14}C$ is an unstable isotope and undergoes radioactive decay. The $^{14}C$ is produced in the atmosphere where it is oxidized to $CO_2$ and $CO_2$ is then absorbed by plants until the $^{12}C/^{14}C$ ratio in all living matter is essentially the same as that in the atmosphere. When something dies, it stops absorbing carbon and the amount of $^{14}C$ diminishes with time, as it naturally undergoes radioactive decay. The rate of decay for the $^{14}C$ is measurable and can be calculated. The decay rate for $^{14}C$ is slow, about 5730 years, relative to the movement of carbon through the food chain, from plants to animals to bacteria. All carbon in biomass at earth's surface contains atmospheric levels of $^{14}C$ whereas petrochemical feedstock that has been dead and in the ground for millions of years will have little to no $^{14}C$. Therefore, material derived from a recently living plant will have an abundance of $^{14}C$ that is approximately equal to that in the atmosphere, whereas petrochemical feedstocks will not have a $^{14}C$ signature.

By knowing the feedstocks of individual components of a molecule, one can estimate its amount of bio-based or modern carbon. For example, if all the component carbons of an ingredient are from plant- or animal-basis, it is deemed 100% bio-based or modern carbon; if only half of the component carbons are from bio-based or modern sources, while the other half of the component carbons are from non-modern sources such as coal, subterranean natural gas, oil or petroleum-based carbon, then the ingredient is 50% bio-based or modern carbon. This number, designated as Percent Modern Carbon (pMC), has been described by others as Biorenewable Carbon Index (BCI) or Renewable Carbon Index (RCI), and is used synonymously herein. As long as one is knowledgeable about the source of all the carbons in the molecule of interest, that is, whether they are derived from modern carbon sources or non-modern carbon sources, one can estimate the Percent Modern Carbon (pMC) using Equation (1):

$$\text{Estimated } pMC = \frac{\text{(number of carbons from modern carbon sources)}}{\text{(total number of carbons from all sources)}} \times 100\% \tag{1}$$

Alternatively, one can analyze for bio-based or modern carbon content, alternately termed Percent Modern Carbon (pMC), can be carried out by standard test methodology such as radiocarbon analysis, according to ASTM method D6866-05, which relies on analyzing the sample for radioactive $^{14}C$. Using $^{14}C$ analysis and calculations, one can determine or confirm the amount of carbon in a material from fossil carbon, which is coal, oil or petroleum-based carbon. By measuring the amount of radioactive carbon in a sample, the amount of modern carbon or bio-based carbon can be determined. As one can understand, the Percent Modern Carbon (pMC), Biorenewable Carbon Index (BCI)

or Renewable Carbon Index (RCI) is a measure of the percent of modern or biobased carbon in an individual ingredient or in a composition.

The Percent Modern Carbon (pMC), Biorenewable Carbon Index (BCI) or Renewable Carbon Index (RCI) only refers to the element, carbon, in the molecule or compound. Therefore, it is an index of the ratio of new, modern, bio-based carbon to "old", typically petrochemical-based carbon. pMC (as well as its synonymous terms BCI and RCI) does not refer to any other elements such as H, N, O, S, etc. that may be present in a compound. One complication in the calculation of pMC is that inorganic carbon, such as that from the carbonates, would be included as "old" carbon, although it might originate from a "natural" mineral source. However, laboratories do have ways to deal with this complication experimentally and can account for mineral-based carbon. Materials with 100% modern carbon or bio-based carbon have no fossil carbon or petroleum-based carbon and are considered carbon from renewable resources.

The radioactive carbon dating analysis that serves as the bases for pMC/BMI/RCI may be performed using American Society of Testing Materials (ASTM) method D6866-05, which is herein incorporated by reference. ASTM D6866-05 describes various techniques for measuring radioactive carbon using 1) accelerator mass spectrometry (AMS), 2) benzene synthesis, or 3) carbon dioxide absorption, also known as the carbon dioxide cocktail method. For benzene synthesis or carbon dioxide absorption methods, a liquid scintillation counter (LSC) is used to detect byproducts of the $^{14}C$ decay process. When preparing a sample for radiocarbon analysis, the sample composition maybe dehydrated, to prepare the sample for testing. Depending on the method used for radiocarbon analysis, the degree of uncertainty may vary slightly. Using ASTM method D6866-05, the degree of uncertainly is approximately 1 to 2%. Using an LSC, the degree of uncertainly reaches approximately ±3%. When using the AMS method or the benzene synthesis method to measure $^{14}C$, radioactive carbon count must be corrected for isotropic fractionation to obtain a corrected radiocarbon count. The carbon dioxide cocktail method does not require a correction for isotropic fractionation. The radioactive carbon dating process and analysis may be done for whole compositions or for individual components of compositions, and any combinations or variations thereof.

In a first aspect, a method for determining the suitability of ingredients for use in the novel cleaning compositions described herein involves performing an assessment of the bio-basis of the ingredient, either through the estimation means described above or by analytical data such as that described in ASTM D6866-05. It is preferable that ingredients used herein are predominantly, if not entirely, renewably sourced, i.e., biologically-based or bio-based, as well as readily and completely biodegradable. It has been found in the course of the present work that individuals with Multiple Chemical Sensitivities or MCS may tolerate ingredients with higher content of modern carbon better than ingredients high in content of non-modern carbon, such as petrochemicals. According to one aspect of the instant disclosure, therefore, cleaning ingredients—and preferably all formula ingredients—are selected to contain at least 80%, and more preferably at least 85% bio-based or modern carbon, more preferably at least 90% bio-based or modern carbon, and most preferably 100% bio-based or modern carbon. It is preferred that the entire formulation be at least 90% bio-based or modern carbon, more preferably greater than about 95% bio-based or modern carbon, and most preferably greater than about 99% bio-based or modern carbon.

Selection of Ingredients

It has been determined in the course of the present work described herein that even ingredients that claim or analyze to be 100% bio-based can contain undesirable contaminants, such as low levels of residual petrochemical solvents, catalysts, or unsafe by-products. Hence, it is important to also analyze for materials that contain known hazardous volatile organic compounds (VOCs) and carcinogens, and/or that may contain potential "telltale" indicators for petrochemicals, such as phenyl derivatives. This is typically accomplished by conducting a headspace analysis of the ingredient under consideration for use in a particular cleaning formulation. Methods have been developed for this purpose, most specifically EPA Compendium Method TO-15, "Determination Of Volatile Organic Compounds (VOCs) In Air Collected In Specially-Prepared Canisters And Analyzed By Gas Chromatography/Mass Spectrometry (GC/MS)," EPA, 1999, and U.S. EPA Method TO-11A, "Determination of Formaldehyde in Ambient Air Using Adsorbent Cartridge Followed by High Performance Liquid Chromatography (HPLC)," EPA, 1999.

The analytes from such a headspace determination can be compared against authoritative lists of hazardous ingredients, such as can be found in the Clean Air Act—Toxic and Flammable Substances for Accidental Release Prevention list, the Clean Air Act—Hazardous Air Pollutant list, the Comprehensive Environmental Response, Compensation, and Liability Act—Hazardous Substance list, the Clean Water Act—Priority Pollutant list, the Emergency Planning & Community Right to Know Act—Toxic Release Inventory Chemical list, the Federal Insecticide, Fungicide, and Rodenticide Act—Registered Pesticide list, the Occupational Safety and Health Act—Air Contaminants list, and/or the Resource Conservation and Recovery Act—Hazardous Constituents list. In another aspect, therefore, a method for determining the suitability of an ingredient for use in novel cleaning compositions as described herein involves determining the level of VOCs that may be contributed to a final formulation by performing a headspace analysis on the ingredient. In a similar aspect, a method for determining the suitability of a cleaning composition for use with individuals that exhibit MCS involves determining the level of VOCs in the headspace of the as-formulated cleaning composition. It may be understood that physiological responses may differ for each contaminant, and most preferably none of the analytes found in the headspace is to be found on the authoritative lists. Analytes that might be found on the authoritative lists should be present at levels below about 1000 $\mu g/m^3$, more preferably below 10 $\mu g/m^3$.

Finally, through working with individuals that exhibit MCS in the course of the instant work, it has been determined that it is advantageous that cleaning compositions essentially contain no active components that have a vapor pressure exceeding 0.1 mm Hg at 20° C. It is further desirable to screen out chemicals that may react with proteins to form immunogenic conjugates. Without being bound by theory, it is believed that moieties such as surfactant residues that have a chain length of greater than 8 carbon atoms are insufficiently reactive with proteins to form immunogenic complexes. Alternatively, it is postulated that any conjugate having greater than an 8-carbon atom chain length that may form, are present in concentrations that are lower than a threshold level needed to trigger an immunogenic response. As such, it is preferred to formulate cleaning products that contain ingredients, especially surfactants with hydrophobic carbon chains that are essentially devoid of carbon chains of 8 or less. In other words, surfactants and other moieties having greater than 8-carbon chain lengths are especially preferred.

It is further advantageous for a cleaning composition to also be devoid of impurities that have a vapor pressure exceeding 0.1 mm Hg at 20° C. Impurity or impurities as used herein therefore refer to an ingredient that is not knowingly or intentionally desired to be incorporated into a cleaning composition of the instant disclosure by a formulator or other individual, as will be readily understood by one skilled in the relevant art. In yet another aspect, therefore, a method for determining the suitability of ingredients for use in novel cleaning compositions as described herein involves selecting ingredients that contain no active component, other than biologically-derived ethanol denatured without petrochemicals, that has a vapor pressure exceeding 0.1 mm Hg at 20° C. In still another aspect, a method for determining the suitability of ingredients for use in formulating the novel cleaning compositions described herein involves selecting ingredients that contain no impurities that have a vapor pressure greater than 0.1 mm Hg at 20° C. Marketing studies have confirmed that consumers associate fragrance substantivity with increased cleanliness. However, multiple scientific studies have implicated fragrances as being the culprit in exacerbating or causing deleterious health effects in susceptible individuals or entire segments of the population. It is therefore preferable to incorporate fragrances that are known to not cause deleterious effects. Without being bound by theory, the incorporation of optically active isomers of fragrance molecules in their naturally occurring form is favored as possibly having less adverse effects than their synthetic analogs.

Evaluation of Ingredients and Formulations

Once candidate ingredients are identified and tested as described above, they are evaluated for use in potential cleaning formulations using a blind study protocol. The blind studies used in the course of the instant work were comprised of a specially selected panel of volunteers. Volunteers diagnosed with both multiple chemical sensitivities (MCS) and asthma have been found to be able to detect the presence of problematic chemicals, even at low levels. A panel comprised of just such individuals was used for many aspects of the studies conducted herein. While animals use olfactory-mediated defense systems to detect, locate and identify predators in their surrounding environment, it has been found that human subjects are similarly able to discriminate among negative odors accurately. See E. A. Krusemark and W. Li, "Enhanced olfactory sensory perception of threat in anxiety: An event-related fMRI study," *Chemosensory Perception,* 5 (2012) 37-45; the article in its entirely is herein incorporated by reference.

In fact, people with MCS have demonstrated an ability to detect harmful chemicals at levels far lower than the rest of the population. In the course of the instant work, at least one individual with MCS was used to rank prospective ingredients for acceptability in cleaning formulations based upon sensory responses, which included olfactory as well as skin contact. Instrumental analyses were then implemented to correlate results with sensory ratings from the human panel, and to identify and/or quantify the chemicals detected and deemed to be potentially harmful to humans. Ingredients that were deemed acceptable by the human panel and the instrumental analyses were then used as raw materials for cleaning products described herein. It is believed that this level of pre-screening and testing represents a first in the world for consumer cleaning product formulations work, and has provided an unprecedented level of safety testing for consumer products. Accordingly, in one aspect of the technology newly presented and described herein, a method for providing cleaning formulations for use by the general public and chemically-sensitized individuals, in particular, involves:

1. determining the bio-basis, expressed as a pMC, of an ingredient or ingredients for use in a cleaning product, wherein the pMC must be 80% or greater to be regarded as acceptable for use in the cleaning product;

2. formulating an aqueous cleaning composition using the acceptable ingredient or ingredients from step (1.); and 3. performing a headspace analysis of the cleaning composition of step (2.) to confirm that the cleaning composition contains analyte levels of less than 1000 $\mu g/m^3$ of any VOCs, other than biologically-derived ethanol, which are regulated by governmental bodies;

wherein determining step (1.) comprises performing an analysis of the feedstock of the ingredient or ingredients according to ASTM method D6866-05 or one consistent therewith.

As a double-check on the safety of cleaning product formulation ingredients, they can be evaluated for the presence or absence of potentially harmful volatile organic carbon (VOC) compounds. In a recent publication it was found that 37 products emitted 156 different VOCs, with an average of 15 VOCs per product. Of these 156 VOCs, 42 VOCs are classified as toxic or hazardous under U.S. federal laws, and each product emitted at least one of these chemicals. See A. Steinemann, "Volatile Emissions from Common Consumer Products," *Air Quality, Atmosphere & Health*, March 2015; the article in its entirely is herein incorporated by reference. Emissions of carcinogenic hazardous air pollutants (HAPs) from green fragranced products were not significantly different from regular fragranced products. The most common chemicals in fragranced products were terpenes which, interestingly, were not found to be present in fragrance-free formulations. Of the volatile ingredients found in the headspace of these products, fewer than 3% were disclosed on any product label or material safety data sheet (MSDS).

After the acceptance of ingredients is established via the methods identified above, cleaning products using these approved chemicals may then be formulated and evaluated for efficacy. As it is recognized that combinations of effects can cause antagonistic responses, evaluations of fully formulated products were then carried out via sensory evaluation and VOC analysis. This permits further evaluation of the suitability of product formulations and the ability to assess product performance as compared with existing cleaning products. This was done on a qualitative rating scale both for cleaning efficacy and for presumed safety.

Accordingly, in another aspect, a method for providing cleaning formulations for use by chemically-sensitized individuals in addition to the general public, involves:

1. determining the bio-basis, expressed as a pMC, of an ingredient or ingredients for use in a cleaning product wherein the pMC must be 80% or greater to be regarded as acceptable for use in the cleaning product;

2. evaluating the ingredient or ingredients from step 1. for acceptability by at least one individual who manifests multiple chemical sensitivities;

3. formulating an aqueous cleaning composition using the acceptable ingredient or ingredients from step (2.); and 4. performing a headspace analysis of the cleaning composition of step (3.) to confirm that the cleaning composition contains analyte levels of less than 1000 $\mu g/m^3$ of any VOCs, other than biologically-derived ethanol, which are regulated by governmental bodies; wherein determining step (1.) comprises performing an analysis of the feedstock of the ingredient or ingredients according to ASTM method D6866-05 or one consistent therewith.

In yet another aspect, a method for providing cleaning products for use by chemically-sensitized individuals as well as for the general public, involves, in addition to steps (1.) through (4.) above, at least one of the steps of:

5. confirming the cleaning efficacy of a cleaning product formulated according to steps (1.) through (4.) above; and 6. evaluating the cleaning product formulated according to steps (1.) through (4.) above for acceptability for use by at least one individual who manifests multiple chemical sensitivities.

In a different aspect, a method for providing cleaning products that are particularly well suited for use by chemically-sensitized individuals, includes:

1. assessing the bio-basis of an ingredient or ingredients for use in a cleaning product;

2. evaluating the ingredient or ingredients from step (1.) for acceptability by at least one individual who manifests multiple chemical sensitivities;

3. formulating a cleaning product using the acceptable ingredient or ingredients from step (2.); and 4. performing a headspace analysis of the cleaning product formulated in step (3.) to determine analyte levels; wherein assessing step (1.) includes an analysis of the feedstock of the ingredient or ingredients according to ASTM method D6866-05 or one consistent therewith.

In still another aspect, a method for providing cleaning products according to the instant disclosure includes any of assessing steps (1.) above, further wherein the assessing is achieved by analysis according to or consistent with ASTM D6866-05.

In yet another aspect, a method for providing cleaning products that are particularly well suited for use by chemically-sensitized individuals as well as the general public, includes:

1. assessing the bio-basis of an ingredient or ingredients for use in a cleaning product;

2. evaluating the ingredient or ingredients from step (1.) for acceptability by at least one individual who manifests multiple chemical sensitivities;

3. formulating a cleaning product using the acceptable ingredient or ingredients from step (2.); and 4. performing a headspace analysis of the cleaning product formulated in step (3.); wherein assessing step (1.) includes an analysis of the feedstock of the ingredient or ingredients by analysis that may be according to ASTM method D6866-05, a method that is consistent therewith, by consulting appropriate tabulated material, or by any combination of the foregoing.

In yet still another aspect, a method for providing cleaning products that are particularly well suited for use by chemically-sensitized individuals as well as the general public, includes, in addition to any of steps (1.) through (5.) above, at least one of the following criteria:

a. the ingredient or ingredients of step (1.) have a pMC of at least 80%, more preferably at least 85%, and most preferably at least 90%;

b. individual ingredients are evaluated for acceptability and deemed suitable by at least one individual who manifests multiple chemical sensitivities or MCS;

c. the cleaning formulation has a pMC of at least 90%, more preferably at least 95%, and most preferably at least 99%;

d. the headspace analysis reveals analyte levels of less than 1000 μg/$m^3$ VOCs, other than biologically-derived ethanol, regulated by governmental bodies;

e. the cleaning formulation is deemed acceptable by at least one individual who manifests multiple chemical sensitivities or MCS.

In yet still another aspect, a cleaning product according to the disclosure herein that is particularly well suited for use by chemically-sensitized individuals as well as the general public, includes: a composition comprising at least one ingredient that is a non-soap cleaning active, wherein the ingredient has a pMC of at least 80%, wherein a headspace analysis of the composition reveals the absence of phenyl compounds or their derivatives, wherein less than about 5% by weight of the ingredients have a vapor pressure that is above 0.1 mm Hg at 20° C., wherein the composition contains less than about 1% by weight of a fragrance material; wherein headspace analysis of the cleaning product reveals analyte levels of less than 1000 μg/$m^3$ VOCs, other than biologically-derived ethanol, that are regulated by governmental bodies; and wherein the composition has less than 0.1% by weight of ingredients that have been demonstrated to cause adverse reactions in chemically-sensitive individuals.

CLEANING FORMULATION COMPONENTS/INGREDIENTS

Cleaning formulations are generally comprised of a mixture of ingredients, each of which serves a purpose in the removal of soils and stains. Generally, such formulations can include one or more of the following active ingredients: surfactants, builders, pH adjusters, solvents, soil release agents, antimicrobials, enzymes and bleaching agents. Such formulations often include ingredients that are more aesthetic in their function: fragrance materials, dyes and colorants, viscosity control agents, pearlizing and opacifying agents, brighteners, preservatives, etc. A discussion of the types and best practice for incorporation of these materials follows.

Anionic Surfactants

Cleaning compositions according to the instant disclosure can contain an anionic surfactant. When an anionic surfactant is added to the compositions described herein, it can typically be added at a level from about 0.05% to about 15% by weight, preferably from about 0.05% to about 5% by weight, and more preferably from about 0.1% to about 1% by weight of the composition. It is preferred that anionic surfactants have alkyl chain lengths greater than 10. It is further preferred that they be sourced from bio-based materials rather than petrochemicals. While this largely eliminates phenyl derivatives, it is envisioned that these materials could also be sourced from bio-based materials. It is yet further preferred that these materials be devoid of contaminants such as 1,4-dioxane. While this largely eliminates ethoxylated derivatives, it is envisioned that these materials can be sourced with a bio-based source of ethylene oxide, and that the 1,4-dioxane contaminant can be scrupulously removed or avoided during production.

Anionic surfactants suitable for use in the formulations discussed herein include $C_{10}$-$C_{14}$ alkyl sulfates and ethoxysulfates (e.g., Stepanol WA-EXTRA from Stepan Company), $C_{10}$-$C_{18}$ alkyl sulfonates, $C_{10}$-$C_{14}$ linear or branched alkyl benzene sulfonates, $C_{10}$-$C_{18}$ alkyl carboxylates, and $C_{10}$-$C_{18}$ ethoxycarboxylates. Suitable examples of carboxylates and ethoxycarboxylates for use herein include sodium and potassium salts of $C_{10}$-$C_{18}$ fatty acids. Alkyl carboxylates are often referred to as soaps, especially those derived from plant or vegetable oils. Preferred for use herein are alkali metal soaps such as sodium or potassium salts of decanoic acid, dodecanoic (lauric) acid, coco fatty acid, tetradecanoaic (myristic) acid, hexadecenoic (palmitic) acid, octadecanoic (stearic) acid, and tall oil fatty acid. Anionic surfactants may also be paired with organic counterions or multivalent counterions in order to prevent interference with cationic species. Further examples of suitable surfactants are described in McCutcheon's Vol. 1: Emulsifiers and Detergents, North American Ed., McCutcheon Division, MC Publishing Co., 1995, which is incorporated herein by reference.

In the course of the instant work, it was found that a number of anionic surfactants containing ethylene oxide, either through petrochemical or bio-based sources, contained detectable levels of 1,4-dioxane as a contaminant. Such surfactants are to be scrupulously avoided, with preference given to anionic surfactants that have no detectable level of 1,4-dioxane.

Highly preferred materials anionic surfactants are those that do not cause any significant color change, nor impart any discoloration, such as graying or yellowing, to the matrices into which they are introduced, or to fabrics to which they may be applied, either during treatment followed by drying and/or curing, or after the drying and/or curing step followed by normal exposure to air, moisture or sunlight.

Nonionic Surfactants

The compositions can contain a nonionic surfactant. When a nonionic surfactant is added to the composition, it can typically be added at a level from about 0.05% to about 30% by weight, preferably from about 0.05% to about 20% by weight, and more preferably from about 0.1% to about 10% by weight of the composition.

Nonionic surfactants that are suitable for use herein include alkyl polysaccharides, as disclosed in U.S. Pat. No. 4,565,647 to Llenado. Especially preferred are those nonionic surfactants that have a hydrophobic group containing from about 10 to about 30 carbon atoms, preferably from about 10 to about 16 carbon atoms in addition to at least one hydrophilic saccharide group such as glucose. Most preferred are alkyl polysaccharides having hydrophobic groups sourced from bio-based materials such as coconut or palm oil, and hydrophilic groups source from bio-based materials, an example of which is glucose sourced from corn. Such polysaccharides sourced from corn are also referred to as alkyl polyglucosides.

The method used for preparing alkyl polysaccharides has been found to be an important factor in their acceptability for use herein. It has been found that alkyl polysaccharides produced using phenyl derivative-based catalysts, such as sodium xylene sulfonate or benzenesulfonic acids, are unacceptable. Alkyl polysaccharides so produced show the presence of phenyl derivatives in their headspace. Without being bound by theory, we believe the problem resides in the presence or absence of phenyl derivatives in the headspace of the polysaccharide raw material, which phenyl derivatives can subsequently carry over into the final cleaning product formulation. By careful selection of the alkyl polysaccharide raw material, making certain that it does not contain phenyl derivative contaminants, an acceptable raw material can be obtained.

Further suitable nonionic surfactants include addition products of fatty alcohols, fatty acids, and fatty amines (most preferably sourced from bio-based materials such as vegetable oils), coupled with alkoxylating agents such as ethylene oxide (EO), propylene oxide (PO), isopropylene oxide (IPO), or butylene oxide (BO), or a mixture thereof. While most alkylene oxide units are derived from petrochemicals sources, and are as such not preferred, it is envisioned that they could be derived from bio-based sources in the future. Moreover, it was found that a number of such ingredients had detectable levels of 1,4-dioxane as a contaminant. Such sources of alcohol alkoxylates must be scrupulously avoided, with preference given to sources that have no detectable level of 1,4-dioxane. Any of the alkoxylated materials of the particular type described hereinafter can be used as the nonionic surfactant. Preferably, the nonionic surfactant is selected from the group consisting of primary and secondary alcohol ethoxylates as well as mixtures thereof. Nonionic surfactants may also contain a mixture of alcohol ethoxylates and propoxylates and mixtures thereof. Further examples of suitable surfactants are described in McCutcheon's Vol. 1: Emulsifiers and Detergents, North American Ed., McCutcheon Division, MC Publishing Co., 1995, which is incorporated herein by reference.

Yet further suitable nonionic surfactants include sorbitan esters. Preferred are polysorbates, which are oily liquids derived from ethoxylated sorbitan, a derivative of sorbitol, that has been esterified with fatty acids. Examples of polysorbate surfactants that may be considered for use with formulations presented herein include Polysorbate 20 (polyoxyethylene (20) sorbitan monolaurate), Polysorbate 40 (polyoxyethylene (20) sorbitan monopalmitate), Polysorbate 60 (polyoxyethylene (20) sorbitan monostearate), and Polysorbate 80 (polyoxyethylene (20) sorbitanmonooleate). Such surfactants are manufactured by Croda Incorporated (Edison, N.J.) under the tradename Tween™, Evonik Industries AG (Essen, Germany) under the tradename Tego® SM, and Oxiteno (São Paolo, Brazil) under the tradename ALKEST® TW. Especially preferred are polysorbates with a pMC of greater than 80%, wherein the ethoxylation is based on biobased ethylene oxide. Examples of such include ECO Tween™ 20, ECO Tween™ 21, ECO Tween™ 22, ECO Tween™ 23, ECO Tween™ 24, ECO Tween™ 28, ECO Tween™ 40, ECO Tween™ 60, ECO Tween™ 61, ECO Tween™ 65, ECO Tween™ 80, ECO Tween™ 81, ECO Tween™ 85, ECO Tween™ 84, and ECO Tween™ 95 from Croda Incorporated.

Highly preferred nonionic surfactants are those that do not cause any significant color change, nor impart any discoloration, such as graying or yellowing, to the matrices or fabrics into which they are introduced or applied, either during treatment followed by drying and/or curing, or after drying and/or curing followed by normal exposure to air, moisture or sunlight exposure.

Amphoteric and Zwitterionic Surfactants

The compositions of the present disclosure can contain amphoteric and/or zwitterionic surfactants. When an amphoteric or zwitterionic surfactant is added to a composition of the present disclosure, it can typically be added at a level from about 0.05% to about 30%, preferably from about 0.05% to about 20% by weight, and more preferably from about 0.1% to about 10% by weight of the composition.

Suitable amphoteric surfactants include amine oxides having the formula $(R_1)(R_2)(R_3)NO$ wherein each of $R_1$, $R_2$ and $R_3$ is independently a saturated substituted or unsubstituted, linear or branched hydrocarbon chain containing from 1 to 30 carbon atoms. Preferred amine oxide surfactants that can be used herein include amine oxides having the formula $(R_1)(R_2)(R_3)NO$ wherein $R_1$ is a hydrocarbon chain having from 1 to 30 carbon atoms, preferably from 10 to 20, more preferably from 10 to 16, further preferably from 10 to 12, and wherein $R_2$ and $R_3$ are independently substituted or unsubstituted, linear or branched hydrocarbon chains comprising from 1 to 4 carbon atoms, preferably from 1 to 3 carbon atoms, and more preferably are methyl groups. $R_1$ may be a saturated substituted or unsubstituted, linear or branched hydrocarbon chain. Suitable amine oxides for use herein are, for instance, naturally derived $C_{12}$-$C_{16}$ amine oxides commercially available from Lonza Group and Stepan Company. It is especially preferred that the pendent alkyl groups $R_2$ and $R_3$ are derived from bio-based sources, such as wood alcohol.

Suitable zwitterionic surfactants for use with the formulations presented herein may contain both cationic and anionic hydrophilic groups on the same molecule at a relatively wide pH range. A typical cationic group is a quaternary ammonium group, although other positively charged groups like phosphonium, imidazolium and sulfonium groups can be used. Typical anionic hydrophilic groups are carboxylates and sulfonates, although other groups like sulfates, phosphonates, and the like can be used. A generic formula for some zwitterionic surfactants that can be used herein is $R_1$—N'($R_2$)($R_3$)$R_4$X, wherein $R_1$ is a hydrophobic group comprising from 10 to 30 carbon atoms; $R_2$ and $R_3$ are each $C_1$-$C_4$ alkyl, hydroxyalkyl or other substituted alkyl group which can also be joined to form ring structures with the N; $R_4$ is a moiety joining the cationic nitrogen atom to the hydrophilic group and is typically an alkylene, hydroxy alkylene, or polyalkoxy group containing from 1 to 10 carbon atoms; and X is the hydrophilic group which is preferably a carboxylate or sulfonate group. Preferred hydrophobic groups $R_1$ are bio-based alkyl groups containing from 10 to 24, preferably less than 18, and more preferably less than 16 carbon atoms. The hydrophobic group can contain unsaturation and/or substituents and/or linking groups such as aryl groups, amido groups, ester groups and the like. In general, the simple alkyl groups are preferred for cost and stability reasons. It is especially preferred if the pendent alkyl groups $R_2$ and $R_3$ could be derived from bio-based sources, such as methyl groups derived from bio-based sources such as wood alcohol. Examples of amphoteric surfactants include alkylamphoglycinates, and alkyl iminopropionate. Highly preferred zwitterionic surfactants include betaine and sulphobetaine surfactants, derivatives thereof or mixtures thereof. The betaine or sulphobetaine surfactants are preferred herein as they are particularly suitable for the cleaning of delicate materials, including fine fabrics such as silk, wool and other naturally derived textile materials. Betaine and sulphobetaine surfactants are also extremely mild to the skin and/or fabrics to be treated that come in contact with the user's skin.

Suitable betaine and sulphobetaine surfactants to be used herein include the betaine/sulphobetaine and betaine-like detergents wherein the molecule contains both basic and acidic groups which form an inner salt giving the molecule both cationic and anionic hydrophilic groups over a broad range of pH values. Some common examples of these detergents are described in U.S. Pat. No. 2,082,275 to Daimler, et al., U.S. Pat. No. 2,702,279 to Funderburk, et al., and U.S. Pat. No. 2,255,082 to Orthner, et al., which are incorporated herein by reference. Further examples of suitable surfactants are described in McCutcheon's Vol. 1: Emulsifiers and Detergents, North American Ed., McCutcheon Division, MC Publishing Co., 1995, which is incorporated herein by reference.

Highly preferred materials of this class of amphoteric and zwitterionic surfactants are those that do not cause any significant color change, nor impart any discoloration, such as graying or yellowing, to the matrices into which they are introduced, or to fabrics to which they may be applied, either during treatment followed by drying and/or curing, or after the drying and/or curing step followed by normal exposure to the elements, such as air, moisture or sunlight exposure.

Cationic Surfactants

The compositions of the present disclosure can contain a cationic surfactant. When a cationic surfactant is added to the compositions disclosed herein, it can typically be added at a level from about 0.05% to about 30% by weight, preferably from about 0.05% to about 20% by weight, and more preferably from about 0.1% to about 10% by weight of the composition.

The cationic surfactant can optionally be one or more fabric softener actives. Preferred fabric softening actives according to the present disclosure include amines and quaternized amines. The following are examples of preferred softener actives: N,N-di(tallowyl-oxy-ethyl)-N.N-dimethyl ammonium chloride; N,N-di(canolyl-oxy-ethyl)-N,N-di-methyl ammonium chloride; N,N-di(tallowyl-oxy-ethyl)-N-methyl, N-(2-hydroxyethyl) ammonium methyl sulfate; N,N-di(canolyl-oxy-ethyl)-N-methyl, N-(2-hydroxyethyl) ammonium methyl sulfate; N,N-di(tallowylamidoethyl)-N-methyl, N-(2-hydroxyethyl) ammonium methyl sulfate; N,N-di(2-tallowyloxy-2-oxo-ethyl)-N,N-dimethyl ammonium chloride; N,N-di(2-canolyloxy-2-oxo-ethyl)-N,N-dimethyl ammonium chloride; N,N-di(2-tallowyloxyethylcarbonyloxyethyl)-N,N-dimethyl ammonium chloride; N,N-di(2-canolyl-oxyethylcarbonyloxyethyl)-N,N-dimethyl ammonium chloride; N-(2-tallowyloxy-2-ethyl)-N-(2-tallowyloxy-2-oxoethyl)-N,N-dimethyl ammonium chloride; N-(2-canolyloxy-2-ethyl)-N-(2-canolyloxy-2-oxo-ethyl)-N,N-dimethyl ammonium chloride, N,N,N-tri(tallowyl-oxy-ethyl)-N-methyl ammonium chloride; N,N,N-tri(canolyl-oxy-ethyl)-N-methyl ammonium chloride; N-(2-tallowyloxy-2-oxoethyl)-N-(tallowyl)-N,N-dimethyl ammonium chloride; N-(2-canolyloxy-2-oxoethyl)-N-(canolyl)-N,N-dimethyl ammonium chloride; 1,2-ditallowyl-oxy-3-N,N,N-trimethylammoniopropane chloride; and 1,2-dicanolyloxy-3-N,N,N-trimethylammoniopropane chloride; and mixtures of the above actives. Particularly preferred is N,N-di(tallowyl-oxy-ethyl)-N,N-dimethyl ammonium chloride, where the tallow chains are at least partially unsaturated and N,N-di(canoloyl-oxy-ethyl)-N,N-dimethyl ammonium chloride, N,N-di(tallowyl-oxy-ethyl)-N-methyl, N-(2-hydroxyethyl) ammonium methyl sulfate; N,N-di(canolyl-oxy-ethyl)-N-methyl, N-(2-hydroxyethyl) ammonium methyl sulfate; and mixtures thereof. Additional fabric softening agents useful herein are described in U.S. Pat. No. 5,643,865 to Mermelstein, et al.; U.S. Pat. No. 5,622,925 to de Buzzaccarini, et al.; U.S. Pat. No. 5,545,350 to Baker, et al.; U.S. Pat. No. 5,474,690 to Wahl, et al.; U.S. Pat. No. 5,417,868 to Turner, et al.; U.S. Pat. No. 4,661,269 to Trinh, et al.; U.S. Pat. No. 4,439,335 to Burns; U.S. Pat. No. 4,401,578 to Verbruggen; U.S. Pat. No. 4,308,151 to Cambre; U.S. Pat. No. 4,237,016 to Rudkin, et al.; U.S. Pat. No. 4,233,164 to Davis; U.S. Pat. No. 4,045,361 to Watt, et al.; U.S. Pat. No. 3,974,076 to Wiersema, et al.; U.S. Pat. No. 3,886,075 to Bernadino; U.S. Pat. No. 3,861,870 to Edwards, et al.; and European Patent Application publication No. 472,178, to Yamamura, et al.; all of said documents being incorporated herein by reference.

Other suitable cationic surfactants include ethoxylated quaternary ammonium surfactants. Some preferred ethoxylated quaternary ammonium surfactants include PEG-5 cocoammonium methosulfate; PEG-15 cocoammonium chloride; PEG-15 oleoammonium chloride; and bis(polyethoxyethanol) tallow ammonium chloride. While these cationic surfactants are not preferred due to the ethylene oxide units usually being petrochemically-based, it is envisioned that the ethylene oxide units could also be bio-based. Further examples of suitable surfactants are described in McCutcheon's Vol. 1: Emulsifiers and Detergents, North American Ed., McCutcheon Division, MC Publishing Co., 1995, which is incorporated herein by reference.

The counterion to these cationic surfactants may be selected, without limitation, from the group consisting of fluoride, chloride, bromide, iodide, chlorite, chlorate, hydroxide, hypophosphite, phosphite, phosphate, carbonate, formate, acetate, lactate, and other carboxylates, oxalate, methyl sulfate, ethyl sulfate, benzoate, and salicylate, and the like. Highly preferred materials of this class of cationic surfactants and their counterions are those that do not cause any significant color change, nor impart any discoloration, such as graying or yellowing, to the matrices into which they are introduced, or to fabrics to which they may be applied, either during treatment followed by drying and/or curing, or after the drying and/or curing step followed by normal exposure to the elements, such as air, moisture or sunlight exposure.

Builders and pH Adjusters

Builders are materials used to boost the performance of surfactants used for cleaning. Their best builder compounds react with multivalent cations, "softening" water by removing "hardness" ions (e.g., calcium and magnesium) that bind with surfactants, reducing their effectiveness. Moreover, these hardness ions can react with stains, making them more difficult to remove. Some builders also modify solution pH to provide alkalinity, which aids cleaning (stain neutralization, saponification, surface modification). Further, some builders can disperse and/or suspend soils, due to their ability to modify the surface charge on the soils that come into solution. Preferred builder compounds include alkali and alkaline earth metal salts of bicarbonates, borates, carbonates, carboxylates, phosphates, phosphonates, silicates, sulfonates, and polymeric builders such as acrylates, maleates, and combinations thereof. Especially preferred compounds are those with a pMC of greater than 80%, including alkali and alkaline earth metal salts of citric acid, gluconic acid, glutaric acid, maleic, succinic, and polyitaconate acid.

Adjustment of pH may be carried out by including a small quantity of an acid in the formulation. Because no strong pH buffers need be present, only small amounts of acid may be required. The pH may be adjusted with inorganic or organic acids, for example hydrochloric acid or alternatively with monobasic or dibasic organic acids, such as acetic acid, maleic acid or in particular glycolic acid. Additional acids that can be used include, but are not limited to, methyl sulfonic, hydrochloric, sulfuric, phosphoric, citric, maleic, and succinic acids.

Adjustment of pH may be carried out by including a small quantity of a base in the formulation. Because no strong pH buffers need be present, only small amounts of base may be required. The pH may be adjusted with inorganic bases, including, but not limited to, alkali metal or alkaline earth metal salts of hydroxides, carbonates, bicarbonates, borates, sulfonates, phosphates, phosphonates and silicates. The pH may be adjusted with organic bases, including, but not limited to, salts of monocarboxylic acids, salts of dicarboxylic acids, salts of citric acid and other suitable organic acids with water soluble conjugate bases presented previously herein. The pH may be adjusted with organic bases such as the alkanolamines including methanol-, ethanol- and propanolamines, including dimethanol-, diethanol- and dipropanolamines, and including trimethanol-, triethanol- and tripropanolamines.

Highly preferred materials of this class of pH adjusters are those that do not cause any significant color change, nor impart any discoloration, such as graying or yellowing, to the matrices into which they are introduced, or to fabrics to which they may be applied, either during treatment followed by drying and/or curing, or after the drying and/or curing step followed by normal exposure to the elements, such as air, moisture or sunlight exposure.

Solvents

SOLVENTS IN GENERAL. The cleaning compositions described herein can contain organic solvents that act as diluents, coupling agents, and to some extent aid cleaning. It is preferred that such solvents be bio-based, and while many solvents are typically obtained from petrochemical sources, it is envisioned that they could be derived from bio-based sources. Further preferred are solvents that do not appreciably contribute to VOCs, with the singular exception of denatured biologically-derived ethanol, which ethanol is not denatured using petrochemicals. The amount of solvent or solvents used with the cleaning compositions herein may vary from 0.05% to 98% by weight, more preferably from 0.1% to 20% by weight, and most preferably 0.5-5% by weight of the composition.

Examples of organic solvents include, but are not limited to, $C_1$-$C_6$ alkanols, $C_1$-$C_6$ diols, $C_1$-$C_{10}$ alkyl ethers of alkylene glycols, $C_3$-$C_{24}$ alkylene glycol ethers, polyalkylene glycols, short chain carboxylic acids, short chain esters, isoparaffinic hydrocarbons, mineral spirits, alkylaromatics, terpenes, terpene derivatives, terpenoids, terpenoid derivatives, formaldehyde, and pyrrolidones. Alkanols include, but are not limited to, methanol, ethanol, n-propanol, isopropanol, butanol, pentanol, and hexanol, and isomers thereof. Diols include, but are not limited to, methylene, ethylene, propylene, butylene glycols, as well as $\alpha,\omega$-diols, such as 1,3-propanediol and 1,4-butanediol. Alkylene glycol ethers include, but are not limited to, ethylene glycol monopropyl ether, ethylene glycol monobutyl ether, ethylene glycol monohexyl ether, diethylene glycol monopropyl ether, diethylene glycol monobutyl ether, diethylene glycol monohexyl ether, propylene glycol methyl ether, propylene glycol ethyl ether, propylene glycol n-propyl ether, propylene glycol monobutyl ether, propylene glycol t-butyl ether, di- or tri-polypropylene glycol methyl or ethyl or propyl or butyl ether, acetate and propionate esters of glycol ethers. Short chain esters include, but are not limited to, glycol acetate, and cyclic or linear volatile methylsiloxanes. Water insoluble solvents such as isoparaffinic hydrocarbons, mineral spirits, alkylaromatics, terpenoids, terpenoid derivatives, terpenes, and terpenes derivatives can be mixed with a water-soluble solvent when employed. Most highly desired are solvents possessing a pMC of at least 80%. More preferably 90%, and most preferably 100%. Examples of such solvents are biobased ethanol, diols including propylene glycol, as well as $\alpha,\omega$-diols, such as 1,3-propanediol and 1,4-butanediol.

ETHANOL Ethanol—also known as ethyl alcohol—is a chemical widely found in nature, and is predominantly obtained through fermentation of sugars from yeast. Feedstocks suitable for use in fermentation are wide-ranging, including corn, grapes, molasses, switchgrass, sugarcane, and cassava. Ethanol derived from these plant sources, being derived from so-called modern carbon sources, will have a pMC value of 100%, and is thus suitable for our purposes.

Ethanol can also be obtained through petrochemical processes, such as ethylene hydration, but ethanol made from petrochemical processes would be expected to have a pMC value of 0% and is therefore not preferred. At the time of this writing, almost all ethanol produced in the United States is derived biologically, 95% based from corn.

As a solvent, ethanol is commonly used in cleaning products. Due to its potential for use as an intoxicant, governments may restrict its production and distribution, mandating extensive record-keeping and taxation for use of the pure chemical. For this reason, manufacturers of cleaning products commonly use so-called denatured ethanol, wherein chemicals are added to ethanol in order to make it unfit for human consumption. In the United States and a number of other countries, the use of so-called Completely Denatured Alcohol (CDA) and/or Specially Denatured Alcohol (SDA) is more loosely regulated; payment of taxes for use of CDA or SDA is not required.

In Title 27 of the U.S. Code of Federal Regulations, section 21.151, written as 27 C.F.R. § 21.151, the United States government has codified certain chemicals that may be used for the denaturation of ethanol used with cleaning solutions or household detergents. These chemical additives are either toxic, have odors that render the ethanol distasteful for drinking, and/or impart an unpalatably bitter taste. The list shown in TABLE 1 below comprises the entirety of chemical denaturants that may be added to ethanol for the production of CDA and SDA per 27 C.F.R. § 21 as of 2016.

TABLE 1

| Approved Ethanol Denaturants[a, b] |
|---|
| Acetaldehyde |
| Acetaldol |
| Acetone, U.S.P |
| Alkylate |
| Almond oil, bitter, N.F.X |
| Alpha Terpineol |
| Ammonia solution, strong, N.F |
| Ammonia, aqueous |
| Anethole, N.F |
| Anise oil, N.F |
| Bay oil (myrcia oil), N.F.XI |
| Benzaldehyde, N.F |
| Bergamot oil, N.F.XI |
| Boric acid, N.F |
| Brucine alkaloid |
| Brucine sulfate, N.F.IX |
| Camphor, U.S.P |
| Caustic soda, liquid |
| Cedar leaf oil, U.S.P.XIII |
| Chlorothymol, N.F.XII |
| Cinnamic aldehyde (cinnamaldehyde), N.F.IX |
| Cinnamon oil, N.F |
| Citronella oil, natural |
| Clove oil, N.F |
| Coal tar, U.S.P |
| Cornmint oil |
| Cyclohexane |
| Denatonium benzoate, N.F. |
| Diethyl phthalate |
| Distilled lime oil |
| Ethyl acetate |
| Ethyl ether |
| Ethyl tertiary butyl ether |
| Eucalyptol, N.F.XII |
| Eucalyptus oil, N.F |
| Eugenol, U.S.P |
| Formaldehyde solution, U.S.P |
| Gasoline |
| Gasoline, unleaded |
| Glycerin (Glycerol), U.S.P |
| Green soap, U.S.P |
| Guaiacol, N.F.X |
| Heptane |
| Hexane |
| High octane denaturant blend |
| Hydrochloric acid, N.F |
| Iodine, U.S.P |
| Isopropyl alcohol |
| Kerosene |
| Kerosene (deodorized) |
| L(−)-Carvone |
| Lavender oil, N.F |
| Lemon oil |
| Menthol, U.S.P |
| Methyl alcohol |
| Methyl isobutyl ketone |
| Methyl n-butyl ketone |
| Methyl salicylate, N.F |
| Methyl tertiary butyl ether |
| Methylene blue, U.S.P |
| Mustard oil, volatile (allyl isothiocyanate), U.S.P.XII |
| n-Butyl alcohol |
| n-Hexane |
| Naphtha |
| Natural gasoline |
| Nicotine solution |
| Nitropropane, mixed isomers of |
| Peppermint oil, N.F |
| Peppermint oil, terpeneless |
| Phenol, U.S.P |
| Phenyl salicylate (salol), N.F.XI |
| Pine needle oil, dwarf, N.F. |
| Pine oil, N.F. |
| Poloxamer 407, N.F. |
| Polysorbate 80, N.F |
| Potassium hydroxide |
| Potassium iodide, U.S.P |
| Pyronate |
| Quassin |
| Quinine bisulfate, N.F.XI |
| Quinine sulfate, U.S.P |
| Raffinate |
| Rosemary oil, N.F. XII |
| Rubber hydrocarbon solvent |
| Safrole |
| Sassafras oil, N.F.XI |
| Shellac (refined) |
| Soap, hard, N.F.XI |
| Sodium iodide, U.S.P |
| Sodium salicylate, U.S.P |
| Spearmint oil, N.F |
| Spearmint oil, terpeneless |
| Spike lavender oil, natural |
| Storax, U.S.P |
| Straight run gasoline |
| Sucrose octaacetate |
| tert-Butyl alcohol |
| Thyme oil, N.F.XII |
| Thymol, N.F |
| Tolu balsam, U.S.P |
| Toluene |
| Vinegar |
| Zinc chloride, U.S.P. |

Notes to TABLE 1:
[a]From U.S. 27 C.F.R. §21.151.
[b]U.S.P. and N.F. in the table refer to the United States Pharmacopeia and the National Formulary, respectively, published annually as a combined compendium of quality standards, USP-NF. Numbers following U.S.P. or N.F. refer to specific monographs within the compendium. These standards are enforced by the United States government. For further information, see www.uspnf.com.

The United States government further stipulates which denaturants are allowed for which purposes. See, for example, https://www.govinfo.gov/content/pkg/CFR-2019-title27-vol1/xml/CFR-2019-title27-vol1-part21.xml #seq-num21.37). The list of allowable uses is extensive, numbering into the hundreds. However, a limited number of denatured ethanol formulae are allowable for the production of cleaning products, as indicated in TABLE 2 below.

TABLE 2

Denatured Ethanol Formulae for Cleaning Products per 27 C.F.R. §21.141[a]

| No.[b] | Directions: To every 100 gallons (378.5 L) of ethyl alcohol, add the following: |
|---|---|
| 1 | Four gal. (15.1 L) methyl alcohol, and ⅛ oz (3.7 ml) denatonium benzoate<br>or: 1 gal. (3.8 L). of methyl isobutyl ketone;<br>or: 1 gal. (3.8 L) of mixed isomers of nitropropane;<br>or: 1 gal. (3.8 L) of methyl n-butyl ketone |
| 3-A | Five gal (18.9 L) of cyclohexane or methyl alcohol. |
| 3-C | Five gal (18.9 L) of isopropyl alcohol. |
| 23-A | Eight gallons (30.3 L) of acetone, U.S.P. |
| 23-H | Eight gallons (30.3 L) of acetone, U.S.P., and 1.5 gallons (5.7 L) of methyl isobutyl ketone. |
| 30 | Ten gallons (37.9 L) of methyl alcohol. |
| 36 | Three gallons (11.4 L) of ammonia, aqueous, 27 to 30 percent by weight;<br>or: 3 gallons (11.4 L) of strong ammonia solution, N.F.;<br>or: 17.5 pounds (7.9 kg) of caustic soda, liquid grade, containing 50 percent sodium hydroxide by weight;<br>or: 8.75 pounds (4.0 kg) of potassium hydroxide, on an anhydrous basis<br>or: 12.0 pounds (5.4 kg) of caustic soda, liquid grade, containing 73 percent sodium hydroxide by weight. |
| 39-B | Two and one-half gallons (9.5 L) of diethyl phthalate and ⅛ gallon (0.47 L) of tert-butyl alcohol. |
| 40 | One-eighth gallon (0.47 L) of tert-butyl alcohol, and 1.5 ounces (42.5 g) of either:<br>(1) brucine alkaloid; or<br>(2) brucine sulfate, N.F. IX; or<br>(3) quassin; or<br>(4) any combination of two or of three of those denaturants. |
| 40-A | One pound (0.45 kg) of sucrose octaacetate and ⅛ gallon (0.47 L) of tert-butyl alcohol. |
| 40-B | One sixteenth (1/16) ounce (1.8 g) of denatonium benzoate, N.F., and ⅛ gallon (0.47 L) of tert-butyl alcohol. |
| 40-C | Three gallons (11.4 L) of tert-butyl alcohol. |

[a]Notes to TABLE 2: Abbreviations used in the table:
gal. = US liquid gallon
L = liter
oz = US fluid ounce
[b]The numbering in the first column of TABLE 2 is taken from the Authorized Formulation designations of 27 C.F.R. §21.

The most commonly-used SDA formulae in the cleaning industry are those containing petrochemically-derived methanol—also known as methyl alcohol, isopropanol—also known as isopropyl alcohol, and t-butanol—also known as tert-butyl alcohol. See formulas 1, 3-A, 3-C, 40, 40-A, 40-B, and 40-C in TABLE 2 above. However, while the amounts of denaturant can be relatively low, surprisingly, the foregoing SDAs are regarded as unsuitable for our purposes. Indeed, in the course of evaluating the suitability of these denatured ethanol formulae for our purposes, only one formula—formula SDA 36—is suitable for purposes of providing compositions especially for use by persons with chemical sensitivities. We attribute this to the presence of the following petrochemically-sourced solvents in SDA formulae other than SDA 36, namely: methyl alcohol, nitropropane, methyl n-butyl ketone, cyclohexane, isopropyl alcohol, acetone, diethyl phthalate, and/or tert-butyl alcohol. Thus, as will be readily understood by those knowledgeable in the relevant area, if ethanol is to be included in any of the cleaning compositions contemplated for use herein, the ethanol should be devoid of any denaturant that is comprised of methyl alcohol, nitropropane, methyl n-butyl ketone, cyclohexane, isopropyl alcohol, acetone, diethyl phthalate, tert-butyl alcohol and any of any of the foregoing.

Upon closer inspection of the denaturants listed in TABLE 2 that may be used with Formula SDA-36, it is more preferred that the ethanol denaturant selected from Formula SDA-36 for use with the cleaning compositions described herein be selected from among sodium hydroxide and potassium hydroxide. Ammonia can also be suitable, provided that the pH of the final product is acidic, such that protonation of the ammonia reduces its own objectionable odor. Products formulated as described herein with up to 5 weight percent SDA 36 ethanol can be well-tolerated by those who self-identify as being chemically sensitive.

It is not totally understood why ethanol, with a vapor pressure of 45 mm Hg at 20° C., may have a different impact on those with multiple chemical sensitivities compared to other volatile organic compounds with vapor pressures above 0.1 mm Hg. However, it may be that ethanol, which has a pMC of 100% when naturally derived as through fermentation, is apparently well tolerated, unless denatured with petrochemicals, for which the pMC would be zero.

Soil Release Agents

The composition can include a soil release agent that is present from about 0% to about 5% by weight, preferably from about 0.05% to about 3% by weight, and more preferably from about 0.1% to about 2% by weight of the composition. Polymeric soil release agents useful in the present disclosure include co-polymeric blocks of terephthalate and polyethylene oxide or polypropylene oxide, and the like. A preferred soil release agent is a copolymer having blocks of terephthalate and polyethylene oxide. While most terephthalate and alkylene oxide units are derived from petrochemicals sources, and are as such not preferred, it is envisioned that they could be derived from bio-based sources. These polymers may be comprised of repeating units of ethylene terephthalate and polyethylene oxide terephthalate at a molar ratio of ethylene terephthalate units to polyethylene oxide terephthalate units from about 25:75 to about 35:65, and the polyethylene oxide terephthalate containing polyethylene oxide blocks having molecular weights from about 300 to about 2000. The molecular weight of this type of polymeric soil release agent can be in the range from about 5,000 to about 55,000. Suitable soil release agents are disclosed in U.S. Pat. No. 4,702,857 to Gosselink, U.S. Pat. No. 4,711,730 to Gosselink, et al., U.S. Pat. No. 4,713,194 to Gosselink; U.S. Pat. No. 4,877,896 to Maldonado, et al.; U.S. Pat. No. 4,956,447 Gosselink, et al.; and U.S. Pat. No. 4,749,596 to Po, et al.; all of which are incorporated herein by reference. Especially desirable optional ingredients are polymeric soil release agents comprising block copolymers of polyalkylene terephthalate and polyoxyethylene terephthalate, and block copolymers of polyalkylene terephthalate and polyethylene glycol. The polyalkylene terephthalate blocks may preferably comprise ethylene and/or propylene groups. Many such soil release polymers are nonionic, for example, the nonionic soil release polymer described in U.S. Pat. No. 4,849,257 to Borcher, Sr., et al., which is incorporated herein by reference. The polymeric soil release agents useful in the present disclosure can include anionic and cationic polymeric soil release agents. Suitable anionic polymeric or oligomeric soil release agents are disclosed in U.S. Pat. No. 4,018,569 to Chang, which is incorporated herein by reference. Other suitable polymers are disclosed in U.S. Pat. No. 4,808,086 to Evans, et al., which is incorporated herein by reference.

Highly preferred materials of this class of soil release polymers are those that do not cause any significant color change, nor impart any discoloration, such as graying or yellowing, to the matrices into which they are introduced, or to fabrics to which they may be applied, either during treatment followed by drying and/or curing, or after the drying and/or curing step followed by normal exposure to the elements, such as air, moisture or sunlight exposure.

Antistatic Agents

The composition can include antistatic agents, which can be present at a level from about 0% to about 5% by weight, preferably from about 0.005% to about 5% by weight, more preferably from about 0.05% to about 2% by weight, and further preferably from about 0.2% to about 1% of the composition. While many of these compounds are derived from petrochemical sources, and are as such not preferred, it is envisioned that they could be derived from bio-based sources. Preferred antistatic agents of the present disclosure include cationic surfactants, including quaternary ammonium compounds such as alkyl benzyl dimethyl ammonium chloride; dicoco quaternary ammonium chloride; coco dimethyl benzyl ammonium chloride; soya trimethyl quaternary ammonium chloride; hydrogenated tallow dimethyl benzyl ammonium chloride; and methyl dihydrogenated tallow benzyl ammonium chloride. Other preferred antistatic agents of the present disclosure are alkyl imidazolinium salts. Preferred antistatic agents are the ion pairs of, e.g., anionic detergent surfactants and fatty amines, or quaternary ammonium derivatives thereof, e.g., those disclosed in U.S. Pat. No. 4,756,850 to Nayar, which is incorporated herein by reference. Other preferred antistatic agents are ethoxylated and/or propoxylated sugar derivatives; while most alkylene oxide units are derived from petrochemicals sources, and are as such not preferred, it is envisioned that they could be derived from bio-based sources. Preferred antistatic agents include monolauryl trimethyl ammonium chloride, hydroxycetyl hydroxyethyl dimethyl ammonium chloride (available from BASF Corporation under the trade name DEHYQUART E), and ethyl bis(polyethoxyethanol) alkyl ammonium ethyl sulfate (available from Evonik Corporation under the trade name VARIQUAT 66), polyethylene glycols, polymeric quaternary ammonium salts (such as those available from Rhodia Group under the MIRAPOL trade name), quaternized polyethyleneimines, vinylpyrrolidone/methacrylamidopropyl trimethylammonium chloride copolymer (available from Ashland Inc. under the trade name GAFQUAT HS-100), triethonium hydrolyzed collagen ethosulfate (available from Angene Chemical under the trade name QUAT-PRO E), and mixtures thereof.

Highly preferred materials of this class of antistatic agents are those that do not cause any significant color change, nor impart any discoloration, such as graying or yellowing, to the matrices into which they are introduced, or to fabrics to which they may be applied, either during treatment followed by drying and/or curing, or after the drying and/or curing step followed by normal exposure to the elements, such as air, moisture or sunlight exposure.

Fragrance Materials

While not preferred due to their propensity to induce untoward symptoms in sensitized individuals, it has been discovered that truly natural, bio-based fragrance materials may be added to the composition. It appears that preferred fragrance materials are comprised of extracts of natural products, upon which no additional functionalization reactions have been carried out. Further, preferred fragrance materials should not have been isolated in such a way as to introduce petrochemical solvents, which appear to further exacerbate symptoms of sensitization. Such materials may have been isolated by methods well-known to the industry such as extraction with suitable solvents, supercritical fluid extraction, steam distillation, rectification, and expression. It is also foreseen that by adding fragrance sources such as plant materials directly to the product, and relying on the product matrix itself to extract the desired fragrance notes, one can obtain desired fragrance notes.

The selection of the perfume or perfumes maybe based upon the application, the desired effect on the consumer, and preferences of the formulator. The perfume selected for use in the compositions and formulations of the present disclosure may contain ingredients with odor characteristics which are preferred in order to provide a fresh impression on the surface to which the composition is directed, for example, those which provide a fresh impression for fabrics. Such perfume may be preferably present at a level from about 0.01% to about 5% by weight, preferably from about 0.05% to about 3% by weight, and more preferably from about 0.1% to about 2% by weight of the total composition.

Preferably, the fragrance materials are mixtures comprising multiple ingredients selected from the group consisting of aromatic and aliphatic esters having molecular weights from about 130 to about 250; aliphatic and aromatic alcohols having molecular weights from about 90 to about 240; aliphatic ketones having molecular weights from about 150 to about 260; aromatic ketones having molecular weights from about 150 to about 270; aromatic and aliphatic lactones having molecular weights from about 130 to about 290; aliphatic aldehydes having molecular weights from about 140 to about 200; aromatic aldehydes having molecular weights from about 90 to about 230; aliphatic and aromatic ethers having molecular weights from about 150 to about 270; and condensation products of aldehydes and amines having molecular weights from about 180 to about 320; and mixtures thereof.

Highly preferred materials of this class of fragrances and perfumes are those that do not cause any significant color change, nor impart any discoloration, such as graying or yellowing, to the matrices into which they are introduced, or to fabrics to which they may be applied, either during treatment followed by drying and/or curing, or after the drying and/or curing step followed by normal exposure to the elements, such as air, moisture or sunlight exposure.

Antimicrobials and Preservatives

Antimicrobials and/or preservatives can be used with the formulations presented herein. Typical concentrations for biocidal effectiveness of these compounds may range from about 0.001% to about 0.8% by weight, preferably from about 0.005% to about 0.3% by weight, and more preferably from about 0.01% to 0.2% by weight of the usage composition. The corresponding concentrations for the concentrated compositions are from about 0.003% to about 2% by weight, preferably from about 0.006% to about 1.2% by weight, and more preferably from about 0.1% to about 0.8% by weight of the concentrated compositions.

Preservatives are especially preferred when organic compounds that are subject to microorganisms are added to the compositions of the present disclosure, especially when they are used in aqueous compositions. When such compounds are present, long term and even short-term storage stability of the compositions and formulations becomes an important issue since contamination by certain microorganisms with subsequent microbial growth often results in an unsightly and/or malodorous solution. Therefore, because microbial growth in these compositions and formulations is highly objectionable when it occurs, it is preferable to include a solubilized water-soluble, antimicrobial preservative, which is effective for inhibiting and/or regulating microbial growth in order to increase storage stability of the preferably clear and often aqueous compositions and formulations of the present disclosure.

Typical microorganisms that can be found in laundry products include bacteria, for example, *Bacillus thurigensis* (*cereus* group) and *Bacillus sphaericus*, and fungi, for example, *Aspergillus ustus*. *Bacillus sphaericus* is one of the most numerous members of *Bacillus* species in soils. In addition, microorganisms such as *Escherichia coli* and *Pseudomonas aeruginosa* are found in some water sources, and can be introduced during the preparation of aqueous solutions of the present disclosure. It is preferable to use a broad-spectrum preservative, for example, one that is effective on both bacteria (both Gram positive and Gram negative) and fungi. A limited spectrum preservative, for example, one that is only effective on a single group of microorganisms, for example, fungi, can be used in combination with a broad-spectrum preservative or other limited spectrum preservatives with complimentary and/or supplementary activity. A mixture of broad-spectrum preservatives can also be used. Antimicrobial preservatives useful in the present disclosure can be biocidal compounds, that is, substances that kill microorganisms, or biostatic compounds, that is, substances that inhibit and/or regulate the growth of microorganisms.

Preferred antimicrobial preservatives include those that are water-soluble and are effective at low levels. While such compounds are commonly derived from petrochemicals sources, and are as such not preferred, it is envisioned that they could be derived from bio-based sources. In general, the water-soluble preservatives that may be used include organic sulfur compounds, halogenated compounds, cyclic organic nitrogen compounds, low molecular weight aldehydes, quaternary compounds, dehydroacetic acid, phenyl and phenoxy compounds, and mixtures thereof. Examples of preservatives useful with the formulations presented herein include, but are not limited to, the short chain alkyl esters of p-hydroxybenzoic acid (commonly known as parabens); N-(4-chlorophenyl)-N-(3,4-dichlorophenyl) urea (also known as 3,4,4-trichlorocarbanilide or triclocarban); 2,4,4-trichloro-2'-hydroxydiphenyl ether, commonly known as Triclosan®); a mixture of about 77% 5-chloro-2-methyl-4-isothiazolin-3-one and about 23% 2-methyl-4-isothiazolin-3-one, a broad spectrum preservative available from the Dow Chemical Company as a 1.5% aqueous solution under the trade name KATHON CG; 5-bromo-5-nitro-1,3-dioxane, available from BASF Corporation under the trade name BRONIDOX L; 2-bromo-2-nitropropane-1,3-diol, available from Dow Chemical Company under the trade name BRONOPOL; 1,1-hexamethylenebis(5-p-(chlorophenyl)biguanide)—commonly known as chlorhexidine—and its salts, for example, with acetic and digluconic acids; a 95:5 mixture of 1,3-bis(hydroxymethyl)-5,5-dimethyl-2,4-imidazolidinedione and 3-butyl-2-iodopropynyl carbamate, available from Lonza Group under the trade name GLYDANT Plus; N-[1,3-bis(hydroxymethyl)2,5-dioxo-4-imidazolidinyl]-N, N'-bis(hydroxy-methyl) urea, commonly known as diazolidinyl urea, available from Ashland Inc. under the trade name GERMALL II; N,N"-methylenebis-[N'-[1-(hydroxymethyl)-2,5-dioxo-4-imidazo-lidinyl]urea]—commonly known as imidazolidinyl urea, available, for example, from 3V-Sigma under the trade name ABIOL, from Induchem USA, Inc. under the trade name UNICIDE U-13, and from Ashland Inc. under the trade name GERMALL 115; polymethoxy bicyclic oxazolidine, available from Ashland Inc. under the trade name NUOSEPT; formaldehyde; glutaraldehyde; polyaminopropyl biguanide under the trade name COSMOCIL CQ or MIKROKIL from Lonza Group; and mixtures thereof. In general, however, the preservative can be any organic preservative material that is appropriate for applying to a fabric. With respect to the embodiments presented herein, such preservative(s) will preferably not cause damage to a fabric appearance, for example, through discoloration, coloration, or bleaching of the fabric. If the antimicrobial preservative is included in the compositions and formulations of the present disclosure, it is preferably present in an effective amount, wherein an "effective amount" means a level sufficient to prevent spoilage or prevent growth of inadvertently added microorganisms for a specific period of time. Preferred levels of preservative are from about 0.0001% to about 0.5% by weight, more preferably from about 0.0002% to about 0.2% by weight, further preferably from about 0.0003% to about 0.1% by weight, of the composition. Optionally, the preservative can be used at a level that provides an antimicrobial effect on the treated fabrics.

The composition may suitably use an optional solubilized, water-soluble anti-microbial active, useful in providing protection against organisms that become attached to the treated material. The free, uncomplexed antimicrobial, e.g., antibacterial, active provides an optimum antibacterial performance. Sanitization of fabrics can be achieved by the compositions of the present disclosure containing, antimicrobial materials, e.g., antibacterial halogenated compounds, quaternary compounds, and phenolic compounds. Some of the more robust antimicrobial halogenated compounds which can function as disinfectants/sanitizers as well as finish product preservatives, and are useful in the compositions of the present disclosure include 1,1'-hexamethylene bis(5-(p-chlorophenyl)biguanide), commonly known as chlor-hexidine, in addition to its salts, e.g., with hydrochloric, acetic and gluconic acids. The digluconate salt is highly water-soluble, at about 70% by weight in water, while the diacetate salt has a solubility of about 1.8% weight in water. When chlorhexidine is used as a sanitizer with the formulations discussed herein, it can typically be present at a level from about 0.001% to about 1.0% by weight, preferably from about 0.002% to about 0.3% by weight, and more preferably from about 0.01% to about 0.1% by weight of the usage composition. In some cases, a level from about 1% to about 2% by weight may be needed for virucidal activity. Other useful biguanide compounds include COSMOCIL CQ, VANTOCIL IB, including poly (hexamethylene biguanide) hydrochloride. Other useful cationic antimicrobial agents include the bis-biguanide alkanes. Usable water-soluble salts of the above are chlorides, bromides, sulfates, alkyl sulfonates such as methyl sulfonate and ethyl sulfonate, phenylsulfonates such as p-methylphenyl sulfonates, nitrates, acetates, gluconates, and the like. Non-limiting examples of useful quaternary compounds include: (1) benzalkonium chlorides and/or substituted benzalkonium chlorides such as commercially available BARQUAT (available from Lonza), MAQUAT (available from Pilot Chemical), VARIQUAT (available from Evonik), and HYAMINE (available from Lonza); (2) dialkyl quaternary such as BARDAC products of Lonza, (3) N-(3-chloroallyl) hexaminium chlorides such as DOWICIDE and DOWICIL available from Dow; (4) benzethonium chloride such as HYAMINE 1622 from Lonza; (5) methylbenzethonium chloride represented by HYAMINE 10X supplied by Lonza, (6) cetylpyridinium chloride such as Cepacol chloride available from of Merrell Labs.

Preferred antimicrobial compounds for use herein include quaternary ammonium compounds containing alkyl or substituted alkyl groups, alkyl amide and carboxylic acid groups, ether groups, unsaturated alkyl groups, and cyclic quaternary ammonium compounds, which can be chlorides, dichlorides, bromides, methylsulphates, chlorophenates, cyclohexyl sulphamates or salts of the other acids. Among the useful cyclic quaternary ammonium compounds are: alkylpyridinium chlorides and/or sulphates, the alkyl group being preferably cetyl, dodecyl or hexadecyl group; alkylisoquinolyl chlorides and/or bromides, the alkyl group being preferably dodecyl group. Particularly suitable quaternary ammonium compounds for use herein include alkyldimethylbenzyl ammonium chloride, octyl decyl dimethylammonium chloride, dioctyl dimethyl ammonium chloride, didecyl dimethyl ammonium chloride, alkyl dimethyl ammonium saccharinate, cetylpyridinium and mixtures thereof.

It is also envisioned that certain inorganic materials based on silver, copper, or clays materials such as Dragonite™ Halloysite clay (Applied Minerals, New York, N.Y.) may be suitable for this purpose. Silver and copper materials may be embedded within the packaging matrix, so as to keep liquids contained therein preserved.

Highly preferred materials of this class of antimicrobials and preservatives are those that do not cause any significant color change, nor impart any discoloration, such as graying or yellowing, to the matrices into which they are introduced, or to fabrics to which they may be applied, either during treatment followed by drying and/or curing, or after the drying and/or curing step followed by normal exposure to the elements, such as air, moisture or sunlight exposure.

Dyes and Colorants

Colorants can be added to the formulations disclosed herein. As many people manifest sensitivity to synthetic dyes, they are not preferred. However, certain natural colorants such as chlorophyll may be suitable for incorporation herein. Pigments, which are insoluble colorants, may also be suitable for incorporation in the formulations described herein. Typical concentrations of these compounds may range from about 0.001% to about 0.8% by weight, preferably from about 0.005% to about 0.3% by weight, and more preferably from about 0.01% to 0.2% by weight of the composition.

Colorants and dyes, especially bluing agents, can be optionally added to the compositions of the present disclosure for visual appeal and performance impression. When colorants are used, they may be used at extremely low levels to avoid fabric staining.

Highly preferred materials of this class of dyes and colorants are those that do not effectively bind to or permanently dye or color fabrics treated by use of the compositions disclosed herein. Furthermore, any colorant or dye anticipated for use herein should not cause any significant color change, nor impart any discoloration, such as graying, to the matrices into which they are introduced, or to fabrics to which they may be applied, either during treatment followed by drying and/or curing, or after the drying and/or curing step followed by normal exposure to the elements, such as air, moisture or sunlight exposure.

Viscosity Control Agents

Optionally added viscosity control agents can be organic or inorganic in nature and may either lower or raise the viscosity of the formulation. While many such compounds are commonly derived from petrochemicals sources, and are as such not preferred, it is envisioned that they could be derived from bio-based sources. Examples of organic viscosity modifiers to lower viscosity are aryl carboxylates and sulfonates (for example including, but not limited to benzoate, 2-hydroxybenzoate, 2-aminobenzoate, benzenesulfonate, 2-hydroxybenzenesulfonate, 2-aminobenzenesulfonate), fatty acids and esters, fatty alcohols, and water-miscible solvents such as short chain alcohols. Examples of inorganic viscosity control agents are water-soluble ionizable salts. A wide variety of ionizable salts can be used. Examples of suitable salts are the halides and acetates of ammonium ion and the group IA and IIA metals of the Periodic Table of the Elements, for example, calcium chloride, lithium chloride, sodium chloride, potassium chloride, magnesium chloride, ammonium chloride, sodium bromide, potassium bromide, calcium bromide, magnesium bromide, ammonium bromide, sodium iodide, potassium iodide, calcium iodide, magnesium iodide, ammonium iodide, sodium acetate, potassium acetate, or mixtures thereof. Calcium chloride is preferred. The ionizable salts are particularly useful during the process of mixing the ingredients to make the compositions herein, and later to obtain the desired viscosity. The amount of ionizable salts used depends on the amount of active ingredients used in the compositions and can be adjusted according to the desire of the formulator. Typical levels of salts used to control the composition viscosity are from 0 to about 10% by weight, preferably from about 0.01% to about 6% by weight, and more preferably from about 0.02% to about 3% by weight of the composition.

Viscosity modifiers or thickening agents can be added to increase the ability of the compositions to stably suspend water-insoluble articles, for example, perfume microcapsules. Such materials include hydroxypropyl substituted guar gum (such as that available from Rhodia Group under the trade name JAGUAR HP200), polyethylene glycol (such as that available from Dow Chemical Corporation under the trade name CARBOWAX 20M), hydrophobically modified hydroxyethylcellulose (such as that available from the Ashland Inc. under the trade name NATROSOL Plus), and/or organophilic clays (for example, hectorite and/or bentonite clays such as those available from Elementis Specialties under the name BENTONE 27, 34 and 38 or from Eckart America under the trade name BENTOLITE L; and those described in U.S. Pat. No. 4,103,047 to Zaki, et al., which is herein incorporated by reference). These viscosity raisers or thickeners can typically be used at levels from about 0.5% to about 30% by weight, preferably from about 1% to about 5% by weight, more preferably from about 1.5% to about 3.5% by weight, and further preferably from about 2% to about 3% by weight, of the composition.

Highly preferred materials of this class of thickeners and viscosity control and viscosity modifiers are those that do not cause any significant color change, nor impart any discoloration, such as graying or yellowing, to the matrices into which they are introduced, or to fabrics to which they may be applied, either during treatment followed by drying and/or curing, or after the drying and/or curing step followed by normal exposure to the elements, such as air, moisture or sunlight exposure.

Pearlizing and Opacifying Agents

Examples of pearlizing or opacifying agents that can be added to the compositions disclosed herein include, but are not restricted to, glycol distearate, propylene glycol distearate, and glycol stearate. Some of these products are available from PMC Group under the KEMESTER trade name. While many such compounds are commonly derived from petrochemicals sources at present, and are as such not preferred, it is envisioned that they could be derived from bio-based sources at some future point.

Highly preferred materials of this class of pearlizing and opacifying agents are those that do bind to treated fabrics, nor cause any significant color change nor impart any discoloration, such as whitening, graying or yellowing, to the matrices into which they are introduced, or to fabrics to which they may be applied, either during treatment followed by drying and/or curing, or after the drying and/or curing step followed by normal exposure to the elements, such as air, moisture or sunlight exposure.

Antioxidants and Sunscreen Materials

Examples of antioxidants that can be added to the compositions of herein are propyl gallate, available from Eastman Chemical Products, Inc. under the trade names TENOX PG and TENOX S-1, and dibutylated hydroxytoluene, available from UOP Inc. under the trade name SUSTANE BHT. Also preferred are antioxidants for providing sun-fade protection for fabrics treated with composition of the present disclosure, such antioxidants being described in EP0773982, and incorporated herein by reference. Preferred antioxidants include 2-(N-methyl-N-cocoamino)ethyl-3',5'-di-tert-butyl-4'-hydroxybenzoate; 2-(N,N-dimethyl-amino)ethyl-3',5'-di-tert-butyl-4'-hydroxybenzoate; 2-(N-methyl-N-cocoamino) ethyl-3',4',5'-trihydroxybenzoate; and mixtures thereof, more preferably 2-(N-methyl-N-cocoamino)ethyl-3',5'-di-tert-butyl-4'-hydroxybenzoate. Of these compounds, the butylated derivatives are preferred in the compositions of the present disclosure because tri-hydroxybenzoates have a tendency to discolor upon exposure to light. While many such compounds are commonly derived from petrochemicals sources, and are as such not preferred, it is envisioned that they could be derived from bio-based sources in the future. The antioxidant compounds of the present disclosure demonstrate light stability in the compositions of the present disclosure. Light stable as used herein means that the antioxidant compounds disclosed herein do not discolor when exposed to either sunlight or simulated sunlight for approximately 2 to 60 hours at a temperature of from about 25° C. to about 45° C. Antioxidant compounds and free radical scavengers can generally protect dyes from degradation by first preventing the generation of single oxygen and peroxy radicals, and thereafter terminating the degradation pathways. Not to be limited by theory, a general discussion of the mode of action for antioxidants and free radical scavengers is disclosed in Kirk-Othmer Encyclopedia of Chemical Technology, Volume 3, pages 128-148, Third Edition (1978) which is incorporated herein by reference.

The formulations that are the subject of the instant disclosure may comprise an organic sunscreen. Suitable sunscreens can have UVA absorbing properties, UVB absorbing properties, or a combination of both. The formulations newly presented herein may preferably comprise a UVA absorbing sunscreen actives that absorb UV radiation having a wavelength from about 320 nm to about 400 nm. Suitable UVA absorbing sunscreen actives include dibenzoylmethane derivatives, anthranilate derivatives such as methylanthranilate and homomethyl-1-N-acetylanthranilate, and mixtures thereof. Examples of dibenzoylmethane sunscreen actives are described in U.S. Pat. No. 4,387,089 to De Polo; and in Sunscreens: Development, Evaluation, and Regulatory Aspects edited by N.J. Lowe and N.A. Shaath, Marcel Dekker, Inc (1990), which are incorporated herein by reference. The UVA absorbing sunscreen active is preferably present in an amount to provide broad-spectrum UVA protection either independently, or in combination with, other UV protective actives that may be present in the composition. Preferred UVA sunscreen actives include dibenzoylmethane sunscreen actives and their derivatives. They include, but are not limited to, those selected from 2-methyldibenzoylmethane, 4-methyldibenzoylmethane, 4-dibenzoylmethane, 4-tert-butyldibenzoylmethane, 2,4-dimethyldibenzoylmethane, 2,5-dimethyldibenzoylmethane, 4,4'-diisopropyl-benzoylmethane, 4-(1,1-dimethylethyl)-4'-methoxydibenzoylmethane, 2-methyl-5-isopropyl-4'-methoxydibenzoylmethane, 2-methyl-5-tert-butyl-4'-methoxydibenzoylmethane, 2,4-dimethyl-4'-methoxydibenzoylmethane, 2,6-dimethyl-4'-tert-butyl-4'-methoxydibenzoylmethane, and mixtures thereof. Preferred dibenzoyl sunscreen actives include those selected from 4-(1,1-dimethylethyl)-4'-methoxydibenzoylmethane, 4-isopropyldibenzoylmethane, and mixtures thereof. A more preferred sunscreen active is 4-(1,1-dimethylethyl)-4'-methoxydibenzoylmethane, which is also known as butylethoxydibenzoylmethane or Avobenzone, is commercially available under the names of PARSOL 1789 from DSM Nutritional Products, LLC and EUSOLEX 9020 from EMD Chemicals Inc./Rona. The sunscreen 4-isopropyldibenzoylmethane, which is also known as isopropyldibenzoylmethane, is commercially available from EMD Chemicals Inc./ Rona under the name of EUSOLEX 8020. The formulations of the instant disclosure may preferably further comprise a UVB sunscreen active that absorbs UV radiation having a wavelength of from about 290 nm to about 320 nm. The compositions may preferably comprise an amount of the UVB sunscreen active that is safe and effective to provide UVB protection either independently, or in combination with, other UV protective actives that may be present in the compositions. The compositions preferably comprise from about 0.1% to about 16%, more preferably from about 0.1% to about 12%, and further preferably from about 0.5% to about 8% by weight, of UVB absorbing organic sunscreen. A wide variety of UVB sunscreen actives are suitable for use herein. Non-limiting examples of such organic sunscreen actives are described in U.S. Pat. No. 5,087,372 to Toyomot and U.S. Pat. Nos. 5,073,371 and 5,073,372 both to Turner, et al., which are incorporated herein by reference. Preferred UVB sunscreen actives are selected from 2-ethylhexyl-2-cyano-3,3-diphenylacrylate (referred to as octocrylene), 2-phenyl-benzimidazole-5-sulphonic acid (PBSA), cinnamates and their derivatives such as 2-ethylhexyl-p-methoxycinnamate and octyl-p-methoxycinnamate, TEA salicylate, octyldimethyl PABA, camphor derivatives and their derivatives, and mixtures thereof. Preferred organic sunscreen actives include 2-ethylhexyl-2-cyano-3,3-diphenylacrylate (commonly named octocrylene), 2-phenyl-benzimidazole-5-sulphonic acid (PBSA), octyl-p-methoxycinnamate, and mixtures thereof. Salt and acid neutralized forms of the acidic sunscreens are also useful.

An agent may also be added to any of the formulations described in the present disclosure to stabilize the UVA sunscreen and to prevent it from photo-degrading on exposure to ultraviolet radiation and thereby maintaining its UVA protection efficacy. Wide ranges of compounds have been cited as providing these stabilizing properties and should be chosen to compliment both the UVA sunscreen and the composition as a whole. Suitable stabilizing agents include, but are not limited to, those described in U.S. Pat. No. 5,972,316 to Robinson; U.S. Pat. No. 5,968,485 to Robinson; U.S. Pat. No. 5,935,556 to Tanner, et al.; and U.S. Pat. No. 5,827,508 Tanner, et al., which are incorporated herein by reference. Preferred examples of stabilizing agents for use in the present formulations disclosure herein include 2-ethylhexyl-2-cyano-3,3-diphenylacrylate (referred to as octocrylene), ethyl-2-cyano-3,3-diphenylacrylate-2-ethylhexyl-3,3-diphenylacrylate, ethyl-3,3-bis (4-methoxyphenyl)acrylate, and mixtures thereof.

Highly preferred materials of this class of antioxidants and sunscreen actives are those that do not cause any significant color change, nor impart any discoloration, such as graying or yellowing, to the matrices into which they are introduced, or to fabrics to which they may be applied, either during treatment followed by drying and/or curing, or after the drying and/or curing step followed by normal exposure to the elements, such as air, moisture or sunlight exposure.

The formulations of the present disclosure may preferably deposit from about 0.1 mg/g fabric to about 5 mg/g fabric of the sun-fade actives to reduce the sun fading of the fabric. Repeated treatment of fabric with formulations presented herein, may result in higher deposition levels, which contributes even further to the sun-fading protection benefit.

Dye Transfer Inhibitors and Dye Fixatives

The formulations disclosed herein can comprise from about 0.001% to about 20% by weight, preferably from about 0.5% preferably to about 10% by weight, and more preferably from about 1% to about 5% by weight of one or more dye transfer inhibitors or dye fixing agents.

Compositions and formulations of the present disclosure can contain ethoxylated amines, amphoterics, betaines, polymers such as polyvinylpyrrolidone, and other ingredients that inhibit dye transfer. While many such compounds are commonly derived from petrochemicals sources, and are as such not preferred, it is envisioned that they could be derived from bio-based sources. Optional dye fixing agents can be cationic, and based on quaternized nitrogen compounds or on nitrogen compounds having a strong cationic charge that is formed in situ under the conditions of usage. Cationic fixatives are available under various trade names from several suppliers. Representative examples include: CROSCOLOR PMF (July 1981, Code No. 7894) and CROSCOLOR NOFF (January 1988, Code No. 8544) ex Crosfield; INDOSOL E-50 (Feb. 27, 1984, Ref. No. 6008.35.84; polyethyleneamine-based) ex Sandoz; SANDOFIX TPS, ex Sandoz, is a preferred dye fixative for use herein. Additional non-limiting examples include SANDOFIX SWE (a cationic resinous compound) from Sandoz, REWIN SRF, REWIN SRF-O and REWIN DWR Crochet-Beitlich GMBH; Tinofix ECO, Tinofix FRD and Solvent from Ciba-Geigy. Other cationic dye fixing agents are described in "After treatments for Improving the Fastness of Dyes on Textile Fibres", Christopher C. Cook, Rev. Prog. Coloration, Vol. XH, (1982). Dye fixing agents suitable for use in the formulations of the instant disclosure include ammonium compounds such as fatty acid-diamine condensates, inter alia, the hydrochloride, acetate, methosulphate and benzyl hydrochloride salts of diamine esters. Non-limiting examples include oleyldiethyl aminoethylamide, oleylmethyl diethylenediamine methosulphate, and monostearylethylene diaminotrimethylammonium methosulphate. In addition, the N-oxides of tertiary amines; derivatives of polymeric alkyldiamines, polyamine-cyanuric chloride condensates; and aminated glycerol dichlorohydrins are suitable for use as dye fixatives in the compositions of the presented herein.

Highly preferred materials of this class of dye transfer inhibitors and dye fixatives are those that do not cause any significant color change, nor impart any discoloration, such as graying or yellowing, to the matrices into which they are introduced, or to fabrics to which they may be applied, either during treatment followed by drying and/or curing, or after the drying and/or curing step followed by normal exposure to the elements, such as air, moisture or sunlight exposure.

Chlorine Scavengers

The compositions of the present disclosure may optionally comprise from about 0.01%, preferably from about 0.02%, more preferably from about 0.25% to about 15%, further preferably to about 10%, and yet more preferably to about 5% of a chlorine scavenger. In cases wherein the cation portion and the anion portion of the non-polymeric scavenger each react with chlorine, the amount of scavenger can be adjusted to fit the needs of the formulator. While many such compounds are commonly derived from petrochemicals sources, and are as such not preferred, it is envisioned that they could be derived from bio-based sources. Suitable chlorine scavengers include ammonium salts having the formula: $R_3R'NX$ wherein each R is independently hydrogen, $C_1$-$C_4$ alkyl, $C_1$-$C_4$ substituted alkyl, and mixtures thereof. In one embodiment of the foregoing formula, R is preferably hydrogen or methyl, more preferably hydrogen; R' is hydrogen, $C_1$-$C_{10}$ alkyl, $C_1$-$C_{10}$ substituted alkyl, and mixtures thereof; R' is preferably hydrogen; and X is a compatible anion. Non-limiting examples for X include chloride, bromide, citrate, and sulfate; X is preferably chloride. Non-limiting examples of preferred chlorine scavengers are ammonium chloride, ammonium sulfate, and mixtures thereof; ammonium chloride is preferred. Other chlorine scavengers include reducing agents such as thiosulfate.

Highly preferred materials of this class of chlorine scavengers are those that do not cause any significant color change, nor impart any discoloration, such as graying or yellowing, to the matrices into which they are introduced, or to fabrics to which they may be applied, either during treatment followed by drying and/or curing, or after the drying and/or curing step followed by normal exposure to the elements, such as air, moisture or sunlight exposure.

Wetting Agents

The formulations and compositions disclosed herein may contain as an optional ingredient from about 0.005% to about 3.0% by weight, and more preferably from about 0.03% to 1.0% by weight of a wetting agent. Such wetting agents may be selected from polyhydroxy compounds. While many such compounds are commonly derived from petrochemicals sources, and are as such not preferred, it is envisioned that they could be derived from bio-based sources. Examples of water soluble polyhydroxy compounds that can be used as wetting agents in the compositions disclosed herein include glycerol, polyglycerols having a weight-average molecular weight from about 150 to about 800, and polyoxyethylene glycols and polyoxypropylene glycols having a weight-average molecular weight from about 200 to about 4000, preferably from about 200 to about 1000, and more preferably from about 200 to about 600. Polyoxyethylene glycols having a weight-average molecular weight from about 200 to about 600 are especially preferred. Mixtures of the above-described polyhydroxy compounds may also be used. A particularly preferred polyhydroxy compound is polyoxyethylene glycol having a weight-average molecular weight of about 400, available from Dow Chemical Corporation under the trade name PEG-400.

Highly preferred materials of this class of wetting agents are those that do not cause any significant color change, nor impart any discoloration, such as graying or yellowing, to the matrices into which they are introduced, or to fabrics to which they may be applied, either during treatment followed by drying and/or curing, or after the drying and/or curing step followed by normal exposure to the elements, such as air, moisture or sunlight exposure.

Electrolytes

Suitable inorganic salts for use as an optional electrolyte in the present compositions include $MgI_2$, $MgBr_2$, $MgCl_2$, $Mg(NO3)_2$, $Mg_3(PO_4)_2$, $Mg_2P_2O_7$, $MgSO_4$, magnesium silicate, NaI, NaBr, NaCl, NaF, $Na_3PO_4$, $Na_2SO_3$, $Na_2SO_4$, $NaNO_3$, $Na_4P_2O_5$, sodium silicate, sodium metasilicate, sodium tetrachloroaluminate, sodium tripolyphosphate (STPP), Na2S3O7, sodium zirconate, $CaF_2$, $CaCl_2$, $CaBr_2$, $CaI_2$, $CaSO_4$, $Ca(NO_3)_2$, KI, KBr, KCl, KF, $KNO_3$, $KIO_3$, $K_2SO_4$, $K_2SO_3$, $K_3PO_4$, $K_4(P_2O_7)$, potassium pyrosulfate, potassium pyrosulfite, LiI, LiBr, LiCl, LiF, $LiNO_3$, $AlF_3$, $AlCl_3$, $AlBr_3$, $AlI_3$, $Al_2(SO4)_3$, $Al(PO_4)$, $Al(NO_3)_3$, aluminum silicate; including hydrates of these salts and including combinations of these salts or salts with mixed cations e.g. potassium aluminum $AlK(SO_4)_2$ and salts with mixed anions, e.g. potassium tetrachloroaluminate and sodium tetrafluoroaluminate. Salts incorporating cations from groups IIIa, IVa, Va, VIa, VIIa, VIII, Ib, and IIb on the periodic chart with atomic numbers greater than are also useful in reducing dilution viscosity but less preferred due to their tendency to change oxidation states and thus they can adversely affect the odor or color of the formulation or lower weight efficiency. Salts with cations from group Ia or IIa with atomic numbers greater than 20 as well as salts with cations from the lanthanide or actinide series are useful in reducing dilution viscosity, but less preferred due to lower weight efficiency or toxicity. Mixtures of above salts are also useful.

Also preferred are quaternary ammonium salts, quaternary alkyl ammonium salts, quaternary dialkyl ammonium salts, quaternary trialkyl ammonium salts and quaternary tetraalkyl ammonium salts wherein the alkyl substituent comprises a methyl, ethyl, propyl, butyl or higher $C_5$-$C_{12}$ linear alkane radical, or combinations thereof. Organic salts useful with the compositions presented herein include magnesium, sodium, lithium, potassium, zinc, and aluminum salts of carboxylic acids, including formates, acetates, propionates, pelargonates, citrates, gluconates, lactates, and aromatic acids such as benzoates, phenolates, and substituted benzoates or phenolates, such as phenolates, salicylates, polyaromatic acids, terephthalates, and polyacids e.g. oxylates, adipates, succinates, benzenedicarboxylates and benzenetricarboxylates. Other useful organic salts include carbonates and/or hydrogen carbonate ($HCO_3^{-1}$) when the pH is targeted to be alkaline, alkyl and aromatic sulfates and sulfonates, e.g., sodium methyl sulfate, benzene sulfonates and derivatives such as xylene sulfonate, and amino acids.

Electrolytes can comprise mixed salts of the above single salts, salts neutralized with mixed cations such as potassium/sodium tartrate, partially neutralized salts such as sodium hydrogen tartrate or potassium hydrogen phthalate, and salts comprising one cation with mixed anions.

Highly preferred mixed salt materials comprising inorganic and organic electrolytes are those that do not cause any significant color change, nor impart any discoloration, such as graying or yellowing, to the matrices into which they are introduced, or to fabrics to which they may be applied, either during treatment followed by drying and/or curing, or after a drying and/or curing step that may be followed by normal exposure to air, moisture or sunlight.

Generally, inorganic electrolytes are preferred over organic electrolytes for better weight efficiency and lower costs. Mixtures of inorganic and organic salts can be used. Typical levels of electrolyte in the present compositions can be less than about 10% by weight, preferably from about 0.5% to about 5% by weight, more preferably from about 0.75% to about 2.5% by weight, and further preferably from about 1% to about 2% by weight of the inventive composition.

Enzymes

Additional desirable adjuncts may be enzymes (although it may be preferred to also include an enzyme stabilizer), including, but not limited to hydrolases, hydroxylases, cellulases, peroxidases, laccases, mannases, amylases, lipases and proteases. Proteases are one especially preferred class of enzymes. Typical examples of proteases include Maxatase and Maxacal from Genencor International, Alcalase, Savinase, and Esperase, all available from Novozymes North America, Inc. See also U.S. Pat. No. 4,511,490 to Stanislowski, et al., incorporated herein by reference. Further suitable enzymes are amylases, which are carbohydrate-hydrolyzing enzymes. It may also be preferred to include mixtures of amylases and proteases. Suitable amylases include Termamyl from Novozymes, North America Inc, and Maxamyl from Genencor International Co. Still other suitable enzymes are cellulases, such as those described in U.S. Pat. No. 4,479,881 to Tai; U.S. Pat. No. 4,443,355 to Murata, et al.; U.S. Pat. No. 4,435,307 to Barbesgaard, et al.; and U.S. Pat. No. 3,983,082 to Ohya, et al., incorporated herein by reference. Yet other suitable enzymes are lipases, such as those described in U.S. Pat. No. 3,950,277 to Silver; U.S. Pat. No. 4,707,291 to Thorn, et al.; U.S. Pat. Nos. 5,296,161 and 5,030,240 both to Wiersema, et al.; and U.S. Pat. No. 5,108,457 to Poulose, et al., incorporated herein by reference. The hydrolytic enzyme may be present in an amount of about 0.01-5%, more preferably about 0.01-3%, and further preferably about 0.1-2% by weight of the detergent. Mixtures of any of the foregoing hydrolases are desirable, especially protease/amylase blends.

Highly preferred materials of this class of enzymes are those that do not cause any significant residual odor or color change, nor impart any discoloration, such as graying or yellowing, to the matrices into which they are introduced, or to fabrics to which they may be applied, either during treatment followed by drying and/or curing, or after the drying and/or curing step followed by normal exposure to the elements, such as air, moisture or sunlight exposure.

Bleaching Agents

The compositions disclosed herein may optionally comprise from about 0.01%, preferably from about 0.02% by weight, more preferably from about 0.25% to about 15% by weight, further preferably to about 10% by weight, and yet more preferably to about 5% by weight of a bleaching agent. Suitable bleaching agents include peroxygen and peroxide-releasing compounds. Peroxygen compounds include alkali metal salts of percarbonate, perborate and peroxymonosulfate. Peroxide compounds, including hydrogen peroxide and compounds generating hydrogen peroxide in solution, peroxyacids and precursors to peroxyacids and peroxyimidic acids, and metal based oxidants are also suitable. Suitable bleaching agents include preformed peracids and organic peroxides, including alkonyl and acyl peroxides such as tertiary butyl peroxide and benzoyl peroxide, and related alkonyl and acyl peroxide and superoxide derivatives of alkyls and arenes. Additionally, an appropriate bleach activator for the active oxygen source or peroxide may be present, such those found in Arbogast, et al., U.S. Pat. Nos. 5,739,327 and 5,741,437; Alvarez, et al.; U.S. Pat. No. 5,814,242, Deline, et al.; U.S. Pat. Nos. 5,877,315; and 5,888,419 to Casella, et al., which relate to cyanonitrile derivatives; U.S. Pat. Nos. 4,959,187 and 4,778,816 to Fong, et al.; U.S. Pat. Nos. 5,112,514 and 5,002,691 to Bolkan, et al., and U.S. Pat. No. 5,269,962 to and Brodbeck, et al., which relate to alkanoyloxyacetyl derivatives; and U.S. Pat. Nos. 5,234,616, 5,130,045 and 5,130,044 to Mitchell, et al., all of which relate to alkanoyloxyphenyl sulfonates; all of which are incorporated herein by reference.

Highly preferred materials of this class of bleaching agents are those that do not cause any significant fabric damage or color change, nor impart any discoloration, such as graying or yellowing, to the matrices into which they are introduced, or to fabrics to which they may be applied, either during treatment followed by drying and/or curing, or after the drying and/or curing step followed by normal exposure to the elements, such as air, moisture or sunlight exposure.

Brighteners

Optical brighteners, also referred to as fluorescent whitening agents or FWAs, have long been used to impart whitening to fabrics during the laundering process. These fluorescent materials act by absorbing ultraviolet wavelength of light and emitting visible light, generally in the color blue wavelength ranges. The FWAs settle out or deposit onto fabrics during the wash cycle. These include the stilbene, styrene, and naphthalene derivatives, which upon being impinged by ultraviolet light, emit or fluoresce light in the visible wavelength. While many such compounds are commonly derived from petrochemicals sources, and are as such not preferred, it is envisioned that they could be derived from bio-based sources. It is also envisioned that by being dyes, there are individuals with MCS that may not be able tolerate their presence, and as such natural ingredients such as pigments that possess the ability to fluoresce may be preferable.

FWAs or brighteners are useful for improving the appearance of fabrics, which have become dingy through repeated soilings and washings. Due to the cationic nature of the composition, it is preferred that the FWAs not be explicitly anionic but rather either nonionic; cationic; amphoteric; or neutralized, ion-paired moieties of anionic FWAs as described in Petrin, et al., U.S. Pat. No. 5,057,236. Preferred anionic FWAs for ion-pairing according to Petrin, et al., '236 are Blankophor BBH, RKH and BHC, from Blankophor GmbH & Co. KG; and Tinopal 5BMX-C, CBS-X and RBS, from BASF Corporation. Fluorescent whiteners most currently used in common laundry compositions generally fall into a category referred to in the art as diaminostilbene disulfonic acid-cyanuric chloride brighteners or DASC-brighteners. These compounds have the following general formula (I):

(I)

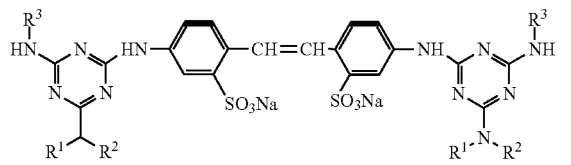

Examples of such DASC fluorescent whiteners include those sold by BASF Corporation under the tradename "Tinopal," which are substituted stilbene 2,2'-disulfonic acid products, e.g., disodium, 4'-bis-((4-anilino-6-morpholino-1,3,5-triazin-2-yl)amino)stilbene-2,2'-disulfonate, sold as Tinopal AMS; disodium, 4'-bis-((4-anilino-6-(N-2-hydroxyethyl-N-methylamino)-1,3,5-triazin-2-yl)amino)stilbene-2,2'-disulfonate, sold as Tinopal 5BM; disodium, 4'-bis-((4-anilino-6-(bis-(2-hydroxyethyl)amino)-1,3,5-triazin-2-yl)amino)stilbene-2,2'-disulfonate, sold as Tinopal UNPA. Another example sold by Bayer Corporation is disodium-4,4'-bis-((4-anilino-6-methylamino)-1,3,5-triazin-2-yl)amino)stilbene-2,2'-disulfonate, sold as Phorwite HRS.

Examples of suitable FWAs can be found in U.K. Patent Nos. 1,298,577; 2,076,011; 2,026,054; 2,026,566; 1,393,042; and U.S. Pat. No. 3,951,960 to Heath, et al., U.S. Pat. No. 4,298,290 to Barnes, et al., U.S. Pat. No. 3,993,659 to Meyer, U.S. Pat. No. 3,980,713 to Matsunaga, et al., and U.S. Pat. No. 3,627,758 to Weber, et al., incorporated herein by reference. See also, U.S. Pat. No. 4,900,468 to Mitchell, et al., column 5, line 66 to column 6, line 27, incorporated herein by reference.

As stated above, most preferred are cationic, nonionic, and amphoteric FWAs, such as those cited in U.S. Pat. Nos. 4,433,975, 4,432,886, 4,384,121, all to Meyer and U.S. Pat. No. 4,263,431 to Weber, et al., and incorporated herein by reference. Further examples of suitable FWAs are described in McCutcheon's Vol. 2: Functional Materials, North American Ed., McCutcheon Division, MC Publishing Co., 1995, and Encyclopedia of Chemical Technology, 11th volume, John Wiley & Sons, 1994, both of which are incorporated herein by reference. Other examples of fluorescent brightening materials suitable for use with the formulations presented herein may be found in U.S. Pat. No. 6,251,303 to Bawendi, et al.; U.S. Pat. No. 6,127,549 to Hao, et al.; U.S. Pat. No. 6,133,215 to Zeiger, et al.; U.S. Pat. No. 6,117,189 to Reinehr, et al.; U.S. Pat. No. 6,120,704 to Martini; and U.S. Pat. No. 6,162,869 to Sharma, et al., incorporated herein by reference.

Highly preferred materials of this class of brighteners are those that do not cause any significant color change, nor impart any discoloration, such as graying or yellowing, to the fabrics to which they are applied, either during treatment followed by drying and/or curing, or after the drying and/or curing step followed by normal exposure to the elements, such as air, moisture or sunlight exposure.

EXAMPLES AND STUDIES

Using the novel assessment protocols defined herein, additional cleaning product formulation guidelines can be developed and promulgated and made available for cleaning product manufacturers. Following the processes disclosed and described herein, a series of products were formulated and tested against commercially available brands in each category, using standard industrial assay techniques. The approach taken to preparing the formulations described herein is believed to be unique in that it links product safety, environmental stewardship and product performance. Customers, therefore, do not have to sacrifice product performance for safety and/or sustainability.

Study 1: Effect of Petroleum-Based Ingredients

As surfactants make up the majority of cleaning product formulations, it is highly important that their contributions be accounted for in individuals that experience MCS. In has been postulated that avoiding petrochemicals may be a first-tier approach in making safer cleaning products. Disappointingly, there are numerous products on the market that claim to be petrochemical-free, and yet are not acceptable to some who experience MCS. As such, a number of raw materials from typical source manufacturers were evaluated in the course of the instant work for their actual bio-renewable carbon. Disappointingly, a number were found to contain hybrid surfactants of significant petrochemical content. The results are shown below in TABLE 3.

TABLE 3

Surfactants and Percent Modern Carbon

| Surfactant | Percent Modern Carbon (pMC)[a] |
|---|---|
| Sodium alkylbenzene sulfonate | 0% |
| Lauramine oxide | 0% |
| Sodium lauryl sulfate | 0% |
| $C_{12-14}$ alcohol ethoxylate (7EO) | 48% |
| Cocoamidopropyl betaine | 64% |
| Cocoamidopropyl amine oxide | 72% |
| Cocamide DEA | 75% |
| Sodium coco ether (2EO) sulfate | 75% |
| Cocodimethyl amine oxide | 86% |
| $C_{10-16}$ alkyl polyglucoside | 100% |
| $C_{8-10}$ alkyl polyglucoside | 100% |
| Sodium coco sulfate | 100% |
| Sodium octyl sulfate (from bio-basis) | 100% |

Note to TABLE 3.
[a]Measure of the percent of modern or bio-based carbon in an ingredient or composition, as estimated from evaluation of feedstocks of component carbons, or determined by ASTM D6866-05.

As may be readily observed, many surfactants possess a significant portion, that is 25% or more by weight, of petrochemical contribution. In other words, despite being positioned as "natural" surfactants, their Biorenewable Carbon Index (and thus their bio-renewable carbon content) is less than 80% by weight. As such, it has been found that surfactants that are preferred for use with the compositions described herein are those having a Biorenewable Carbon Index of at least 80%, that is, with a BCI of ≥80%.

Study 2: Effect of Trace Contaminants

In a second study, it was surprisingly found that certain surfactants that had a very high Biorenewable Carbon Index, even as high as 100%, could have adverse effects on certain individuals with MCS. Without being bound by theory, it is believed that this phenomenon is due to the non-exact nature of the BCI or RCI measurement (±3% by weight) vis-à-vis the low amounts of contaminants, perhaps much less than 1% by weight, that are present in certain ingredients. To test this hypothesis, a number of chemically sensitive individuals assessed four types of alkyl polyglucosides, or APGs, from three manufacturers, all of which have an apparent BCI/RCI of 100%. Each of the APG candidates was rated on a 3-point index: Acceptable, Marginal, and Unacceptable. The Marginal and Unacceptable candidates were then analyzed for the presence of trace contaminants. Surprisingly, those candidates all contained detectable amounts of phenyl derivatives (toluene, acetophenone), apparently owing to the nature of the catalyst used during manufacture and the fact that it was perhaps not stripped out prior to distribution. Candidates that were determined to be Acceptable did not have such phenyl residue. The results are shown in TABLE 4 below.

TABLE 4

Acceptability of Candidate Alkyl Polyglucosides

| Surfactant | Percent Modern Carbon (pMC)[a] | Acceptability Rating |
|---|---|---|
| Commercial APG Product A | 100% | Unacceptable |
| Commercial APG Product B | 100% | Unacceptable |
| Commercial APG Product C | 100% | Marginal |
| Commercial APG Product D | 100% | Acceptable |

Note to TABLE 4.
[a]Measure of the percent of modern or bio-based carbon in an ingredient or composition, as estimated from evaluation of feedstocks of component carbons, or determined by ASTM D6866-05.

Study 3: Effect of Carbon Chain Length

In the manufacture of surfactants, it can be assumed that a small amount, albeit a significant one, of feedstock remains unreacted. This amount can often be less than 1% by weight, but to individuals who are sensitive to such species, the impact can be significant. Often, this can result in an olfactory response as lower-chain alcohols are quite odiferous, but to individuals with MCS, the impact is more significant. Without being bound by theory, it is believed that chemicals—especially surfactant residues—that have a chain length of eight carbon atoms or less may react with proteins to form complexes that trigger an immunogenic response. Chemicals that have a carbon chain length greater than eight carbon atoms may be insufficiently reactive with proteins to form such complexes. Alternatively, it is postulated that any conjugates having greater than eight-carbon atom chain lengths that may form, are present in concentrations that are lower than a threshold level needed to trigger an immunogenic response. As such, a number of raw materials were evaluated by a number of chemically sensitive individuals for acceptability using the same scale as above. The results are presented in TABLE 5 below.

TABLE 5

Effect of Carbon Chain Length of Surfactant Feedstock

| Surfactant | Percent Modern Carbon (pMC)[a] | Average Carbon Chain Length | Acceptability Rating |
|---|---|---|---|
| Sodium octyl sulfate (from bio-basis) | 100% | 8 | Unacceptable |
| $C_{8-10}$ alkyl polyglucoside | 100% | 9 | Unacceptable |
| $C_{10-16}$ alkyl polyglucoside | 100% | 13 | Acceptable-Unacceptable* |
| Sodium coco sulfate | 100% | 12 | Acceptable |

Notes to TABLE 5
[a]Measure of the percent of modern or bio-based carbon in an ingredient or composition, as estimated from evaluation of feedstocks of component carbons, or determined by ASTM D6866-05.
*Response received was dependent upon the source of alkyl polyglucoside, which in turn was found to depend on the level of trace contaminants, as discussed above.

Study 4: Volatile Organics

As mentioned above, in an analysis of 37 commercial products, Steinemann (2015) found emissions of 156 different VOCs, with an average of 15 VOCs per product. Of these 156 VOCs, 42 VOCs were classified as toxic or hazardous under U.S. federal laws, and each product emitted at least one of these chemicals. Despite inferences, the emissions of hazardous air pollutants (HAPs) from so-called green fragranced products were not significantly different from non-green labeled fragranced products.

Without being bound to theory, the inventors believe that minimizing or eliminating sources of certain VOC can significantly reduce contaminants that may introduce hazardous air pollutants into consumer cleaning compositions.

Example 1: Effect of Carbon Chain Length of Surfactant Feedstock

A laundry detergent was formulated in accordance with the guidelines presented above. Accordingly, 15.0 parts of alkyl polyglucoside (Triton CG-600, 50% active from Dow Chemical Company) were added to 63.1 parts deionized water with mixing, followed by 13.0 parts of sodium coco sulfate (Stepanol WA-Extra, 29% active from Stepan Company), 2.0 parts glycerine (Pricerene 9091 from Croda), 2.0 parts boric acid, 2.0 parts oleic acid (Acme-Hardesty Co), 1.0 part sodium gluconate, 1 part sodium hydroxide, 0.1 part protease (Novozymes), 0.1 part calcium chloride, 0.1 part sodium chloride, 0.05 parts amylase (Novozymes), and 0.05 parts preservative (Neolone M10, 10% active).

A portion of the resulting formulations, designated Sample F in TABLE 6 below, was then submitted for evaluation and analysis versus a commercially available, safety-positioned, unfragranced liquid detergent product, labeled Sample E in TABLE 6 below. The samples were analyzed via two different methods: U.S. EPA Compendium Method TO-15, "Determination Of Volatile Organic Compounds (VOCs) In Air Collected In Specially-Prepared Canisters And Analyzed By Gas Chromatography/Mass Spectrometry (GC/MS)," EPA, 1999, and U.S. EPA Method TO-11A, "Determination of Formaldehyde in Ambient Air Using Adsorbent Cartridge Followed by High Performance Liquid Chromatography (HPLC)," EPA, 1999. The second of the two analyses is specific for aldehydes such as formaldehyde and acetaldehyde.

TABLE 6 summarizes findings for the two laundry detergent samples. Note that reported analyte values were above a threshold of 1000 μg/$m^3$, thereby ensuring with some confidence that they are emitted from the products:

TABLE 6

HEADSPACE Analysis of Samples by EPA Method TO-15

| Compound | CAS Number | Sample E Liquid Laundry Detergent (>1000 μg/$m^3$)[a, b] | Sample F Liquid Laundry Detergent (>1000 μg/$m^3$)[a, c] |
|---|---|---|---|
| 3,5-Dimethyl-1-hexene | 7423-69-0 | Y | N |
| Cyclotetradecane | 295-17-0 | Y | N |
| 2-Phenoxyethanol | 122-99-6 | Y | N |
| Methyl octanoate | 111-11-5 | Y | N |
| **Trichloromethane (chloroform)*** | 67-66-3 | **Y** | N |
| 11-Bromoundecanoic acid | 2834-05-1 | Y | N |
| Methyl undecanoate | 1731-86-8 | Y | N |
| 2-Propenoic acid,1,7,7-trimethyl-bicyclo[2.2.1]-hept-2-yl ester | 5888-33-5 | Y | Y |
| Isobutyl nonyl oxalate | Unknown | Y | Y |
| 1-Undecanol | 112-42-5 | N | Y |
| 2-Methyl-cyclopentanol | 24070-77-7 | N | Y |
| Pentadecane | 629-62-9 | N | Y |

Notes to TABLE 6:

*Known hazardous substance, cancer risk; bold = classified as toxic or hazardous under U.S. federal law.

[a]Abbreviations are used to indicate presence or absence of material in head space: Y = Yes; _N = No.

[b]Sample E: Commercially available liquid laundry detergent

[c]Sample F: Laundry detergent formulated according to the instant disclosure, described in EXAMPLE 1, above.

The analytes were compared against eight Federal registers of potentially hazardous VOCs, per the study by Steinemann (2015). One analyte found in the commercial product, chloroform, is present on all registries; this is in agreement with the study Steinemann (2015), wherein every product analyzed had at least one such potentially hazardous VOC. Remarkably, chloroform was found to be absent in the liquid laundry detergent product prepared according to the instant specification. In fact, the product prepared according to the methods described herein did not have one chemical that appears on any of the registries of hazardous chemicals present at a level above 1000 μg/m3. The results are summarized in TABLE 7 below.

TABLE 7

Headspace Analysis of Samples via EPA Method TO-15

| Compound | CAS Number | CAA-TFS[a] | CAA-HAP[b] | CERCLA[c] | CWA[d] | EPCRA[e] | FIFRA[f] | OSHA[g] | RCRA[h] |
|---|---|---|---|---|---|---|---|---|---|
| 3,5-Dimethyl-1-hexene | 7423-69-0 | — | — | — | — | — | — | — | — |
| Cyclotetradecane | 295-17-0 | — | — | — | — | — | — | — | — |
| 2-Phenoxyethanol | 122-99-6 | — | — | — | — | — | — | — | — |
| Methyl octanoate | 111-11-5 | — | — | — | — | — | — | — | — |
| **Trichloromethane (chloroform) *** | **67-66-3** | ✓ | ✓ | ✓ | ✓ | ✓ | ✓ | ✓ | ✓ |
| 11-Bromoundecanoic acid | 2834-05-1 | — | — | — | — | — | — | — | — |
| Methyl undecanoate | 1731-86-8 | — | — | — | — | — | — | — | — |
| 2-Propenoic acid, 1,7,7-trimethyl-bicyclo-[2.2.1]hept-2-yl ester | 5888-33-5 | — | — | — | — | — | — | — | — |

TABLE 7-continued

Headspace Analysis of Samples via EPA Method TO-15

| Compound | CAS Number | CAA-TFS[a] | CAA-HAP[b] | CERCLA[c] | CWA[d] | EPCRA[e] | FIFRA[f] | OSHA[g] | RCRA[h] |
|---|---|---|---|---|---|---|---|---|---|
| Isobutyl nonyl oxalate | Unknown | — | — | — | — | — | — | — | — |
| 1-Undecanol | 112-42-5 | — | — | — | — | — | — | — | — |
| 2-Methyl-cyclopentanol | 24070-77-7 | — | — | — | — | — | — | — | — |
| Pentadecane | 629-62-9 | — | — | — | — | — | — | — | — |

Notes to TABLE 7

* Known hazardous substance, cancer risk; bold = classified as toxic or hazardous under U.S. federal law.

CAA-TFS[a]: Clean Air Act-Toxic and Flammable Substances for Accidental Release Prevention CAA-HAP[b]: Clean Air Act-Hazardous Air Pollutant CERCLA[c]: Comprehensive Environmental Response, Compensation, and Liability Act-Hazardous Substance CWA[d]: Clean Water Act-Priority Pollutant EPCRA[e]: The Emergency Planning & Community Right to Know Act-Toxic Release Inventory Chemical FIFRA[f]: Federal Insecticide, Fungicide, and Rodenticide Act-Registered Pesticide OSHA[g]: Occupational Safety and Health Act-Air Contaminants RCRA[h]: Resource Conservation and Recovery Act-Hazardous Constituents The two specimens, Samples E and F were then analyzed via U.S. EPA Method TO-11A, which is specific for aldehydes such as formaldehyde and acetaldehyde. Sample F, a composition prepared in accordance with the methods described in the instant specification, had significantly less acetaldehyde than commercial product Sample B, and is absent of formaldehyde down to the detection limit. Results are summarized below in TABLE 8.

TABLE 8

Headspace Analysis of Samples via EPA Method TO-11A

| Sample | Formaldehyde parts per billion (by volume) | Formaldehyde μg/m³ | Acetaldehyde parts per billion (by volume) | Acetaldehyde μg/m³ |
|---|---|---|---|---|
| Commercial Liquid Detergent (Sample E)[a] | 18.8 | 23.09 | 7.45 | 13.42 |
| Formulated Liquid Detergent (Sample F)[b] | (below detection limit) | (below detection limit) | 3.07 | 5.53 |

Notes to TABLE 8

[a]Sample E: Commercially available liquid laundry detergent

[b]Sample F: Laundry detergent formulated according to the instant disclosure, described in EXAMPLE 1, above.

Study 5: Representative Formulations

Based on the assessment criteria described herein, several cleaning formulas were generated in accordance with the described methods and found to be highly effective at cleaning. And yet, when evaluated by a panel of five individuals that have MCS, the formulas were found to be totally acceptable for use without deleterious physical effects. Representative formulas prepared and tested according to the instant specification are listed in TABLE 9; results are summarized in TABLE 10 below.

TABLE 9

Representative Cleaning Formulas

| Ingredient | Sample F Liquid laundry detergent | Sample G Liquid dishwashing detergent | Sample H All-Purpose cleaner | Sample I General bathroom cleaner |
|---|---|---|---|---|
| Sodium coco sulfate, 29% active | 13.0% | 45.0% | — | — |
| Alkyl polyglucoside, 50% active | 15.0% | 9.0% | 3.0% | 5.0% |
| Cocoamine oxide | — | 12.0% | — | — |
| Glycerine | 2.5% | 3.5% | 1.5% | — |
| Boric acid[b] | 2.0% | | — | — |
| Citric acid[b] | — | 0.25% | — | 4.0% |
| Oleic acid[b, c] | 2.0% | — | — | — |
| Sodium gluconate[b] | 1.0% | — | — | — |
| Sodium hydroxide[d] | 1.0% | — | — | — |
| Potassium citrate[b] | — | — | 0.5% | — |
| Protease | 0.1% | — | — | — |
| Calcium chloride | 0.1% | — | — | — |
| Sodium chloride | 0.1% | — | — | — |
| Amylase | 0.05% | — | — | — |
| Preservative, 10% active | 0.05% | 0.05% | 0.05% | 0.05% |
| Water | q.s. | q.s. | q.s. | q.s. |
| Percent Modern Carbon (pMC)[a] | 99.97% | 97.96% | 99.86% | 99.92% |

Note to TABLE 9.

[a]Measure of the percent of modern or bio-based carbon in an ingredient or composition, as estimated from evaluation of feedstocks of component carbons, or determined by ASTM D6866-05.

[b]pH adjuster, builder.

[c]Defoamer.

[d]pH adjuster.

TABLE 10

Use Results of Representative Cleaning Formulas

| Product | Sample F Liquid laundry detergent | Sample G Liquid dishwashing detergent | Sample H All-Purpose cleaner | Sample I General bathroom cleaner |
|---|---|---|---|---|
| Acceptable Performance (versus commercial products) | Yes | Yes | Yes | Yes |
| Acceptable Use (without ill effects)? | Yes | Yes | Yes | Yes |

In yet another aspect, an all-purpose cleaner that may be prepared according to the information presented herein and be found to be well suited for use especially by chemically-sensitized individuals, contains: 1) 3.0% alkyl polyglucoside, 50% active; 2) 1.5% glycerine; 3) 0.5% potassium citrate, 4) 0.05% preservative, 10% active; and the balance water, where all percents are understood to refer to weight percent. Furthermore, an all-purpose cleaner that may be prepared according to the methods presented herein and consistent with the above composition may be found to have a percent modern carbon (pMC) of approximately 99.86%.

In still another aspect, a general bathroom cleaner that may be prepared according to the information presented herein and be found to be well suited for use especially by chemically-sensitized individuals, contains: 1) 5.0% alkyl polyglucoside, 50% active; 2) 4% citric acid; 3) 0.05% preservative, 10% active; and the balance water, where all percents are understood to refer to weight percent. Furthermore, a general bathroom cleaner that may be prepared according to the methods presented herein and consistent with the above composition may be found to have a percent modern carbon (pMC) of approximately 99.92%.

Study 6: Representative Formulations Including SDA 36

Based on the assessment criteria described herein, several cleaning formulas that additionally included SDA 36 were generated in accordance with the methods described herein and found to be highly effective at cleaning. And yet, the formulas were found to be totally acceptable for use without deleterious physical effects. Representative formulas prepared and tested according to the instant specification are listed in TABLE 11 and results summarized in TABLE 12 below.

TABLE 11

Representative Dual Solvent Cleaning Formulas

| Ingredient | Sample J Liquid laundry detergent | Sample K Liquid dishwashing detergent | Sample L All-Purpose cleaner | Sample M Marble and Stone Cleaner |
|---|---|---|---|---|
| Sodium coco sulfate, 29% active | 55.0% | 45.0% | — | — |
| Alkyl polyglucoside, 50% | 10.0% | 10.0% | 1.5% | 0.3% |
| Cocoamine oxide | — | 15.0% | — | — |
| Glycerine | 2.0% | 3.5% | 0.2% | — |
| Citric acid | — | 0.2% | — | — |
| Potassium citrate | — | — | 0.2% | — |
| Sodium citrate | — | — | — | 0.2% |
| Oleic acid | 1.5% | — | — | — |
| Ethanol SDA 36 | 1.0% | 3.0% | 0.5% | 0.5% |
| Protease | 0.6% | — | — | — |
| Amylase | 0.4% | — | — | — |
| Sodium chloride | 0.1% | — | — | — |
| Sodium gluconate | 0.1% | — | — | — |
| Sodium hydroxide | 0.1% | — | — | — |
| Magnesium sulfate | — | 0.5% | — | — |
| Potassium carbonate | — | — | 0.2% | — |
| Preservative, 10% active | 1.0% | 1.0% | 1.0% | 1.0% |
| Water | q.s. | q.s. | q.s. | q.s. |
| Percent Modern Carbon (pMC)[a] | 96% | 97% | 100% | 100% |

[a]Measure of the percent of modern or bio-based carbon in an ingredient or composition, as estimated from evaluation of feedstocks of component carbons, or determined by ASTM D6866-05.

TABLE 12

Use Results of Representative Cleaning Formulas

| Product | Sample J Liquid laundry detergent | Sample K Liquid dishwashing detergent | Sample L All-Purpose cleaner | Sample M Marble and Granite cleaner |
|---|---|---|---|---|
| Acceptable Performance (versus commercial products)? | Yes | Yes | Yes | Yes |
| Acceptable Use (without ill effects)? | Yes | Yes | Yes | Yes |

In one aspect, a liquid laundry detergent that may be prepared according to the information presented herein and be well suited for use by chemically-sensitive individuals, contains: 1) 55% sodium coco sulfate, 29% active; 2) 10% alkyl polyglucoside, 50% active; 3) 2.0% glycerine; 4) 1.5% oleic acid; 5) 1.0% ethanol SDA 36; 6) 1.0% sodium gluconate; 6) 0.6% protease; 7) 0.04% amylase; 8) 0.1% sodium hydroxide; 9) 0.1% sodium chloride; 10) 1.0% preservative, 10% active; and the balance water, where all percents are understood to refer to weight percent. Furthermore, a liquid laundry detergent that may be prepared according to the methods presented herein and consistent with the above composition may be found to have a percent modern carbon (pMC) of approximately 96%.

In another aspect, a dishwashing detergent that may be prepared according to the information presented herein and be well suited for use especially by chemically-sensitized individuals, contains: 1) 45.0% sodium coco sulfate, 29% active; 2) 10.0% alkyl polyglucoside, 50% active; 3) 15.0% cocamine oxide, 30%; 4) 3.0% glycerine; 5) 0.2% citric acid; 6) 3.0% ethanol SDA 36; 7) 1% preservative, 10% active; and the balance water, where all percents are understood to refer to weight percent. Furthermore, a dishwashing detergent that may be prepared according to the methods presented herein and consistent with the above composition may be found to have a percent modern carbon (pMC) of approximately 97%.

In yet another aspect, an all-purpose cleaner that may be prepared according to the information presented herein and be found to be well suited for use especially by chemically-sensitized individuals, contains: 1) 1.5% alkyl polyglucoside, 50% active; 2) 0.5% ethanol SDA 36; 3) 0.2% glycerine; 4) 0.2% potassium citrate, 5) 0.2% potassium carbonate; 6) 1.0% preservative, 10% active; and the balance water, where all percents are understood to refer to weight percent. Furthermore, an all-purpose cleaner that may be prepared according to the methods presented herein and consistent with the above composition may be found to have a percent modern carbon (pMC) of approximately 99.86%.

In still another aspect, a marble and stone cleaner that may be prepared according to the information presented herein and be found to be well suited for use especially by chemically-sensitized individuals, contains: 1) 0.3% alkyl polyglucoside, 50% active; 2) 0.5% ethanol SDA 36; 3) 0.2% sodium citrate; 3) 1% preservative, 10% active; and the balance water, where all percents are understood to refer to weight percent. Furthermore, a general bathroom cleaner that may be prepared according to the methods presented herein and consistent with the above composition may be found to have a percent modern carbon (pMC) of approximately 100%.

Study 7: Stability Studies

With the passage of time—on the order of weeks to many months—it was noticed that some of the cleaning formulations prepared according to the formulations and methods described herein occasionally turned cloudy in appearance. Composition cloudiness was attributed variously to the formation of precipitates, ingredients settling out of solution, separation of ingredients, or combinations of the foregoing. While not affecting performance in any way, cleaning products that present with cloudy appearances are nevertheless regarded as less than desirable from both marketing and consumer acceptance perspectives. The use of emulsifiers or coupling agents were considered to help prevent ingredients from settling out. Accordingly, a number of experiments were conducted in order to determine how best to maintain the formulations in solution without the unsightly separation of ingredients.

In a first series of stability studies, small amounts of a polysorbate-type nonionic surfactant, formed by the ethoxylation of sorbitan before the addition of lauric acid, were added to several of the cleaning product formulations described herein. The type of cleaning product formulations that were involved were all-purpose cleaners, glass cleaners, wood cleaners and marble/granite/stone cleaners.

In a second series of stability studies, small amounts of an anionic alkyl carboxylate surfactant, potassium cocoate, were added to samples of the same four types of cleaning products as above, namely all-purpose cleaners, glass cleaners, wood cleaners and marble/granite/stone cleaners. Examples of various formulations containing emulsifiers are shown in TABLE 13 below. The results of the stability studies are presented below in TABLE 14.

TABLE 13

Representative Dual Surfactant Cleaning Formulations[a]

| | Formulation Description[b] | | | | | | | | | | | | | |
|---|---|---|---|---|---|---|---|---|---|---|---|---|---|---|
| | AP | AP | AP | AP | AP | AP | MS | MS | MS | GC | GC | GC | WD | WD |
| | Sample No. | | | | | | | | | | | | | |
| Ingredient | L | L1 | L2 | L3 | L4 | L5 | M | M1 | M2 | N | N1 | N2 | P | P1 |
| Alkyl (C10-16) glucoside, 50% | 1.5 | 1.5 | 1.5 | 1.5 | 1.5 | 1.5 | 0.3 | 0.3 | 0.3 | 0.6 | 0.6 | 0.6 | 0.5 | 0.5 |
| Tall Oil Fatty Acid | — | — | — | — | — | — | — | — | — | — | — | — | 1.6 | 1.6 |
| Potassium hydroxide | — | — | — | — | — | — | — | — | — | — | — | — | 0.3 | 0.3 |
| Polysorbate non-ionic surfactant (100% active) | — | 0.1 | 0.3 | — | — | — | — | 0.3 | — | — | 0.3 | — | — | — |
| Alkali metal cocoate (40% active?) | — | — | — | 0.1 | 0.3 | 0.5 | — | — | 0.3 | — | — | 0.3 | — | 0.3 |
| Glycerine | 0.2 | 0.2 | 0.2 | 0.2 | 0.2 | 0.2 | — | — | — | 0.2 | 0.2 | 0.2 | — | — |
| Potassium citrate | 0.2 | 0.2 | 0.2 | 0.2 | 0.2 | 0.2 | — | — | — | — | — | — | — | — |
| Sodium citrate | — | — | — | — | — | — | 0.2 | 0.2 | 0.2 | — | — | — | — | — |
| Ethanol SDA 36 | 0.5 | 0.5 | 0.5 | 0.5 | 0.5 | 0.5 | 0.5 | 0.5 | 0.5 | 0.6 | 0.6 | 0.6 | — | — |
| Potassium carbonate | 0.2 | 0.2 | 0.2 | 0.2 | 0.2 | 0.2 | — | — | — | — | — | — | — | — |
| Water | q.s. | q.s. | q.s. | q.s. | q.s. | q.s. | q.s. | q.s. | q.s. | q.s. | q.s. | q.s. | q.s. | q.s. |
| Percent Modern Carbon (pMC)[c] | 100 | 100 | 100 | 100 | 100 | 100 | 100 | 100 | 100 | 100 | 100 | 100 | 100 | 100 |

Notes to TABLE 13:

[a]Quantities provided in the table are understood to refer to weight % for each ingredient; units are not displayed for sake of brevity.

[b]Abbreviations used: AP = all-purpose cleaner; GC = glass cleaner; WD = wood cleaner; MS = marble, granite and stone cleaner.

[c]Measure of the percent of modern or bio-based carbon in an ingredient or composition, as estimated from evaluation of feedstocks of component carbons, or determined by ASTM D6866-05.

TABLE 14

Physical Stability of Representative Formulations

| Sample No. | Formulation Description[a] AP L | AP L1 | AP L2 | AP L3 | AP L4 | AP L5 | MS M | MS M1 | MS M2 | GC N | GC N1 | GC N2 | WD P | WD P1 |
|---|---|---|---|---|---|---|---|---|---|---|---|---|---|---|
| Rating for Clarity Upon Storage[a] | – | | | | | | – | | | – | | | – | |
| Clarity upon storage, with added emulsifier[b] | | – | – | 0 | + | + | | 0 | + | | 0 | + | | 0[d] |
| Acceptable Performance (versus commercial products)? | Yes | Yes | Yes | Yes | Yes | Yes | Yes | Yes | Yes | Yes | Yes | Yes | Yes | Yes |
| Acceptable Use (without ill effects)? | Yes | Yes | Yes | Yes | Yes | Yes | Yes | Yes | Yes | Yes | Yes | Yes | Yes | Yes |

Notes to TABLE 14:

[a]Abbreviations used: AP = All Purpose Cleaner; GC = Glass Cleaner; WD = Wood Cleaner; MS = Marble, Granite and Stone Cleaner.

[b]Rating scheme: a dash (–) indicates visible precipitate or flocculant; a zero (0) indicates cloudy appearance; and a plus (+) indicates a clear appearance.

[c] Measure of the percent of modem or bio-based carbon in an ingredient or composition, as estimated from evaluation of feedstocks of component carbons, or determined by ASTM D6866-05.

[d]Note that wood cleaner formulations are often cloudy in appearance, due to use of high molecular weight organic compounds, which are not soluble in aqueous solutions. The improvement noted for wood cleaner formulations with the use of emulsifiers herein resulted in elimination of precipitates/precipitation, although the composition retained its cloudy or pearlescent characteristic.

As can be seen from TABLES 13 and 14 above, the addition of an emulsifying agent can help prevent component ingredients of the novel cleaning compositions presented herein from precipitating out of solution or causing the formulations to manifest a cloudy or inhomogeneous appearance. While some improvement in appearance was occasionally found with the use of a polysorbate emulsifier, greater improvements in clarity were achieved through the use of alkali metal carboxylates. The examples presented in TABLES 13 and 14 in addition to other examples, discussions and observations elucidated above give rise to the following descriptions of cleaning formulations that may be provided according to the instant disclosure.

In one instance, an ALL-PURPOSE CLEANER may be prepared according to the information presented herein and be found to be well suited for use especially by chemically-sensitized individuals, either as a dilutable concentrate or ready-to-use product. It may contain 1) 1-35% alkyl polyglucoside, 50% active; 2) 0.5-15% ethanol SDA 36; 3) 0.1-10% potassium cocoate; 4) 0.1-5% potassium citrate, 5) 0.1-5% potassium carbonate; 6) 1.0-10% preservative, 10% active; and the balance water, where all percents are understood to refer to weight percent. Furthermore, an all-purpose cleaner that may be prepared according to the methods presented herein and consistent with the above composition may be found to have a percent modern carbon (pMC) of approximately 100%.

According to one aspect, a MARBLE AND STONE cleaner may be prepared according to the information presented herein and be found to be well suited for use especially by chemically-sensitized individuals, either as a dilutable concentrate or ready-to-use product. It may contain: 1) 0.3-15% alkyl polyglucoside, 50% active; 2) 0.5-15% ethanol SDA 36; 3) 0.2-10% sodium citrate; 4) 0.1-10% potassium cocoate; 5) 1-10% preservative, 10% active; and the balance water, where all percents are understood to refer to weight percent. Furthermore, a marble and stone cleaner that may be prepared according to the methods presented herein and consistent with the above composition may be found to have a percent modern carbon (pMC) of approximately 100%.

A representative GLASS CLEANER may be prepared according to the information presented herein and be found to be well suited for use especially by chemically-sensitized individuals, either as a dilutable concentrate or as a ready-to-use product. It may contain: 1) 0.3-30% alkyl polyglucoside, 50% active; 2) 0.5-15% ethanol SDA 36; 3) 0.1-10% glycerine; 4) 0.1-10% potassium cocoate; 5) 0.1-10% sodium polyitaconate; 6) 0.1-1% preservative, and the balance water, where all percents are understood to refer to weight percent. Furthermore, a glass cleaner that may be prepared according to the methods presented herein and consistent with the above composition may be found to have a percent modern carbon (pMC) of approximately 100%.

An example of a WOOD CLEANER may be prepared according to the information presented herein and be found to be well suited for use especially by chemically-sensitized individuals, either as a dilutable concentrate or ready-to-use product. It may contain: 1) 1-40% tall oil fatty acid; 2) 0.1-10% potassium hydroxide; 3) 1-15% alkyl polyglucoside, 50% active; 4) 0.1-10% potassium cocoate; 5) 0.1-10% sodium polyitaconate; 6) 0.1-1% preservative, and the balance water, where all percents are understood to refer to weight percent. Furthermore, a wood cleaner that may be prepared according to the methods presented herein and consistent with the above composition may be found to have a percent modern carbon (pMC) of approximately 100%.

According to another instance, a DAILY SHOWER CLEANER may be prepared according to the information presented herein and be found to be well suited for use especially by chemically-sensitized individuals either a dilutable concentrate or ready-to-use product. It may contain: 1) 0.3-30% alkyl polyglucoside, 50% active; 2) 0.5-15% propanediol; 3) 0.1-10% ECO Tween 20; 4) 0.1-10% sodium polyitaconate; 5) 0.1-1% preservative, and the balance water, where all percents are understood to refer to weight percent. Furthermore, a wood cleaner that may be prepared according to the methods presented herein and consistent with the above composition may be found to have a percent modern carbon (pMC) of approximately 100%.

In another aspect, a TUB AND TILE CLEANER may be prepared according to the information presented herein and be found to be well suited for use especially by chemically-sensitized individuals, either as a dilutable concentrate or ready-to-use product. It may contain: 1) 1-25% citric acid; 2) 1-30% alkyl polyglucoside, 50% active; 3) 0.1-10% ECO Tween 20; 4) 1-10% preservative, 10% active; and the balance water, where all percents are understood to refer to weight percent. Furthermore, a tub and tile cleaner that may be prepared according to the methods presented herein and consistent with the above composition may be found to have a percent modern carbon (pMC) of approximately 100%.

It is to be noted that the foregoing samples and examples demonstrate the manner in which novel formulations and methods disclosed herein can be used to provide cleaning products and/or dilutable concentrates of such cleaning products that each exhibit enhanced hypoallergenicity and can be generated from sustainable sources without sacrificing cleaning efficacy. The foregoing samples and examples demonstrate the manner in which the compositions and methods described herein provide screening for many recognized deleterious health effects without effectively sacrificing cleaning efficacy for the sake of sustainability of materials.

The instant disclosure presents information that has been described in detail herein with reference to specific embodiments, methods and examples. However, these specific embodiments should not be construed as narrowing the scope of the formulations and methods described herein, but rather construed as illustrative examples. It is to be further understood that obvious embodiments, modifications and equivalents thereof are anticipated and are considered to be within the scope of the newly presented formulations and methods, without departing from the broad spirit contemplated herein. The subject matter of the instant disclosure is further illustrated and described in the claims that follow.

What is claimed is:

1. A cleaning composition for fabrics or hard surfaces, comprising:

a. water;

b. at least 0.05% by weight of an alkyl polyglucoside that contains no undesirable contaminants, wherein the undesirable contaminants are selected from the group consisting of residual petrochemical solvents, phenyl derivatives, unsafe byproducts, and combinations of the foregoing; and c. an additional surfactant selected from the group consisting of:

i) 0.05% to 10% by wt. of at least one polysorbate surfactant;

ii) 0.05% to 10% by wt. of at least one alkyl carboxylate surfactant; and iii) 0.05% to 10% by weight of a combination of at least one polysorbate surfactant and at least one alkyl carboxylate surfactant;

wherein the pMC for each of b. and c. has a value of at least 80%;

wherein a headspace analysis of the cleaning composition confirms that the cleaning composition reveals analyte levels of less than 1000 $\mu g/m^3$ of any VOCs, other than ethanol, which are regulated by governmental bodies;

wherein the cleaning composition has a pMC of at least 90%; and wherein neither b. nor c. has a vapor pressure greater than 0.1 mm Hg at 20° C.

2. The cleaning composition of claim 1, further comprising:

d. 0.05% to 10% by wt. of an organic solvent;

wherein the organic solvent has a pMC of at least 80%; and wherein a headspace analysis of the cleaning composition confirms that the cleaning composition reveals analyte levels of less than 1000 $\mu g/m^3$ of any VOCs, other than ethanol, which are regulated by governmental bodies.

3. The cleaning composition of claim 2, wherein the organic solvent is selected from the group consisting of denatured ethanol, organic diols, and combinations of the foregoing;

wherein the ethanol is biologically derived, and wherein the denaturant is selected from the group consisting of aqueous ammonia, sodium hydroxide, potassium hydroxide and combinations of any of the foregoing;

wherein the organic solvent has a pMC of at least 80%; and wherein a headspace analysis of the cleaning composition confirms that the cleaning composition reveals analyte levels of less than 1000 $\mu g/m^3$ of any VOCs, other than ethanol, which are regulated by governmental bodies.

4. The cleaning composition of claim 3, wherein the denatured ethanol is prepared by adding, to every 100 gal. (378.5 L) of ethyl alcohol, at least one denaturant selected from the group consisting of:

i) three gal. (11.4 L) of aqueous ammonia, 27% to 30% by weight;

ii) three gal. (11.4 L) of strong ammonia solution, N.F.;

iii) 17.5 pounds (7.9 kg) of caustic soda, liquid grade, containing 50% sodium hydroxide by weight;

iv) 8.75 pounds (4.0 kg) of potassium hydroxide, on an anhydrous basis; and v) 12.0 pounds (5.4 kg) of caustic soda, liquid grade, containing 73% sodium hydroxide by weight.

5. The cleaning composition of claim 3, further comprising:

e. 0-10% by weight of an organic builder;

f. 0-10% by weight of an organic pH adjuster; and g. 0-95% of at least one organic solvent;

wherein each of e. through g. has a pMC of at least 80%;

wherein a headspace analysis of the cleaning composition reveals analyte levels of less than 1000 $\mu g/m^3$ of any VOCs, other than ethanol, which are regulated by governmental bodies;

wherein the cleaning composition has a pMC of at least 90%; and wherein none of components e. through g. has a vapor pressure greater than 0.1 mm Hg at 20° C.

6. The cleaning composition of claim 5, comprising components selected from the group consisting of:

i) at least 0.25% by weight of the organic builder;

ii) at least 0.25% by weight of the organic pH adjuster; and iii) at least 0.25% by weight of an organic builder and an organic pH adjuster;

wherein a headspace analysis of the cleaning composition reveals analyte levels of less than 1000 $\mu g/m^3$ of any VOCs, other than ethanol, which are regulated by governmental bodies.

7. The cleaning composition of claim 1, further comprising:

e. 0-10% by weight of an organic builder;

f. 0-10% by weight of an organic pH adjuster; and g. 0-95% of at least one organic solvent;

wherein each of e. through g. has a pMC of at least 80%;

wherein a headspace analysis of the cleaning composition reveals analyte levels of less than 1000 μg/$m^3$ of any VOCs, other than ethanol, which are regulated by governmental bodies;

wherein the cleaning composition has a pMC of at least 90%; and wherein none of components e. through g. has a vapor pressure greater than 0.1 mm Hg at 20° C.

8. The cleaning composition of claim 7, comprising components selected from the group consisting of:

i) at least 0.25% by weight of the organic builder;

ii) at least 0.25% by weight of the organic pH adjuster; and iii) at least 0.25% by weight of an organic builder and an organic pH adjuster;

wherein a headspace analysis of the cleaning composition reveals analyte levels of less than 1000 μg/$m^3$ of any VOCs, other than ethanol, which are regulated by governmental bodies.

9. The cleaning composition of claim 1, generated by the following steps:

1) Determining the bio-basis, expressed as a pMC, of the polyglucoside and the additional surfactant, wherein the pMC must be 80% or greater for each of the polyglucoside and the additional surfactant to be regarded as acceptable for use in the cleaning composition;

2) Formulating an aqueous cleaning composition using the acceptable polyglucoside and additional surfactant from step (1); and 3) Performing a headspace analysis of the cleaning composition of step (2) to confirm analyte levels of less than 1000 μg/$m^3$ of any VOCs, other than ethanol, which are regulated by governmental bodies;

wherein assessing step (1) comprises performing an analysis of the feedstock of the polyglucoside and the additional surfactant according to ASTM method D6866-05 or one consistent therewith.

10. The cleaning composition of claim 6, generated by the following steps:

1) determining the bio-basis, expressed as a pMC, for each of the organic constituents b. through g., wherein the pMC must be 80% or greater for each constituent b. through g. to be regarded as acceptable for use in the cleaning composition;

2) Formulating an aqueous cleaning composition using the acceptable constituents from step (1); and 3) Performing a headspace analysis of the cleaning composition of step (2) to confirm analyte levels of less than 1000 μg/$m^3$ of any VOCs, other than ethanol, which are regulated by governmental bodies;

wherein assessing step (1) comprises performing an analysis of the feedstock of each of constituents b. through g. according to ASTM method D6866-05 or one consistent therewith.

11. The cleaning composition of claim 8, generated by the following steps:

1) Determining the bio-basis, expressed as a pMC, for each of the organic constituents b., c., and e. through g., wherein the pMC must be 80% or greater for each constituent b., c., and e. through g. to be regarded as acceptable for use in the cleaning composition;

2) Formulating an aqueous cleaning composition using the acceptable constituents from step (1); and 3) Performing a headspace analysis of the cleaning composition of step (2) to confirm analyte levels of less than 1000 μg/$m^3$ of any VOCs, other than ethanol, which are regulated by governmental bodies;

wherein assessing step (1) comprises performing an analysis of the feedstock of each of constituents b. through g. according to ASTM method D6866-05 or one consistent therewith.

* * * * *